(12) United States Patent
Xu et al.

(10) Patent No.: US 11,937,121 B2
(45) Date of Patent: Mar. 19, 2024

(54) SCHEDULING REQUEST PROCESSING METHOD AND TERMINAL DEVICE

(71) Applicant: HUAWEI TECHNOLOGIES CO., LTD., Guangdong (CN)

(72) Inventors: Haibo Xu, Beijing (CN); Yiru Kuang, Beijing (CN); Jian Wang, Beijing (CN); Haifeng Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 105 days.

(21) Appl. No.: 16/651,916

(22) PCT Filed: May 15, 2018

(86) PCT No.: PCT/CN2018/086898
§ 371 (c)(1),
(2) Date: Mar. 27, 2020

(87) PCT Pub. No.: WO2019/062142
PCT Pub. Date: Apr. 4, 2019

(65) Prior Publication Data
US 2020/0267594 A1  Aug. 20, 2020

(30) Foreign Application Priority Data
Sep. 29, 2017 (CN) .......................... 201710908302.2

(51) Int. Cl.
*H04W 28/02* (2009.01)
*H04L 1/1829* (2023.01)
(Continued)

(52) U.S. Cl.
CPC ....... *H04W 28/0278* (2013.01); *H04L 1/1848* (2013.01); *H04W 72/1268* (2013.01); *H04W 80/02* (2013.01)

(58) Field of Classification Search
CPC ......... H04W 28/0278; H04W 72/1268; H04W 80/02; H04W 72/21; H04L 1/1848; H04L 1/1893; H04L 1/1887; H04L 1/1883
See application file for complete search history.

(56) References Cited

U.S. PATENT DOCUMENTS

2012/0294269 A1  11/2012  Yamada et al.
2014/0064219 A1   3/2014  Quan et al.
(Continued)

FOREIGN PATENT DOCUMENTS

CN  102595603 A   7/2012
CN  102726112 A  10/2012
(Continued)

OTHER PUBLICATIONS

Ericsson, "Logical Channel Prioritization with short TTI", 3GPP TSG-RAN WG2 #97 , Tdoc R2-1701609 , Athens, Greece, Feb. 13-17, 2017, total 4 pages.
(Continued)

*Primary Examiner* — Mandish K Randhawa
(74) *Attorney, Agent, or Firm* — HUAWEI TECHNOLOGIES CO., LTD.

(57) ABSTRACT

Embodiments of this application provide a scheduling request processing method and a terminal device. The scheduling request processing method includes: determining that a regular buffer status report, BSR, associated with a first logical channel is triggered and has not been canceled; determining that there is no uplink resource available to transmit data of the first logical channel, and a first timer of a terminal device is not running; and triggering a scheduling request, SR, wherein the first timer is configured to delay transmission of the SR.

19 Claims, 12 Drawing Sheets

(51) Int. Cl.
*H04W 72/1268* (2023.01)
*H04W 80/02* (2009.01)

(56) References Cited

U.S. PATENT DOCUMENTS

| | | | |
|---|---|---|---|
| 2016/0157256 A1 | 6/2016 | Tseng | |
| 2017/0188349 A1 | 6/2017 | Lee et al. | |
| 2017/0238337 A1 | 8/2017 | Lee et al. | |
| 2018/0324832 A1* | 11/2018 | He | H04W 72/1284 |
| 2019/0174513 A1* | 6/2019 | Loehr | H04W 72/1268 |
| 2020/0267753 A1* | 8/2020 | Adjakple | H04W 72/23 |
| 2021/0136794 A1* | 5/2021 | Takeda | H04W 4/00 |

FOREIGN PATENT DOCUMENTS

| | | |
|---|---|---|
| CN | 102761967 A | 10/2012 |
| CN | 104661311 A | 5/2015 |
| CN | 106031224 A | 10/2016 |
| CN | 106105306 A | 11/2016 |
| CN | 106507497 A | 3/2017 |
| CN | 106992846 A | 7/2017 |
| CN | 107113651 A | 8/2017 |
| CN | 107113660 A | 8/2017 |
| EP | 2811808 A1 | 12/2014 |
| KR | 20120068966 A | 6/2012 |
| KR | 20140119662 A | 10/2014 |
| KR | 20150050739 A | 5/2015 |
| KR | 20160018309 A | 2/2016 |
| KR | 20160065748 A | 6/2016 |
| RU | 2569321 C2 | 11/2015 |
| WO | 2015020461 A1 | 2/2015 |
| WO | 2017140082 A1 | 8/2017 |

OTHER PUBLICATIONS

3GPP TS 38.321 V1.0.0 (Sep. 2017),3rd Generation Partnership Project;Technical Specification Group Radio Access Network;NR;Medium Access Control (MAC) protocol specification(Release 15),dated Sep. 4, 2017,total 46 pages.
RP-171733 RAN WG2,"Presentation of Specification/Report to TSG:TS 38.321, Version 1.0.0" 3GPP TSG-RAN Meeting #77,Sapporo, Japan, Sep. 11 14, 2017,total 1 pages.
R2-1703210 Ericsson,"Logical Channel Prioritization with short TTI",3GPP TSG-RAN WG2 #97bis,Spokane, USA, Apr. 3-7, 2017,total 3 page.
R2-1710817 Nokia et al.,"SR procedure for NR",3GPP TSG-RAN WG2 #99bis,Prague, Czech Republic, Oct. 9-13, 2017,total 6 page.
Ericsson, Remaining issues for Scheduling Request, 3GPP TSG-RAN WG2 #99bis , Tdoc R2-1711178, Prague, Czech Republic, Oct. 9-13, 2017, 7 pages.
Huawei, HiSilicon, SR Configuration and Triggering for sTTI, 3GPP TSG-RAN WG2 Meeting #99 , R2-1708556, Berlin, Germany, Aug. 21-25, 2017, 4 pages.
Huawei, HiSilicon, SR Cancellation for sTTI, 3GPP TSG-RAN WG2 Meeting #99 , R2-1709416, Berlin, German, Aug. 21-25, 2017, 3 pages.

* cited by examiner

SCHEDULING REQUEST PROCESSING METHOD AND TERMINAL DEVICE

CROSS-REFERENCE TO RELATED APPLICATIONS

This application is a National Stage of International Application No. PCT/CN2018/086898, filed on May 15, 2018, which claims priority to Chinese Patent Application No. 201710908302.2, filed on Sep. 29, 2017, both of which are hereby incorporated by reference in their entireties.

TECHNICAL FIELD

Embodiments of this application relate to the field of communications technologies, and in particular, to a scheduling request processing method and a terminal device.

BACKGROUND

In a future 5G communications system, a terminal device may report a volume of to-be-sent data of the terminal device to a network device by padding a Media Access Control (Media Access Control, MAC) protocol data unit (Protocol Data Unit, PDU) with a buffer status report (Buffer Status Report, BSR). Correspondingly, the network device may send an uplink grant (Uplink grant, UL grant) to the terminal device based on the BSR sent by the terminal device, so as to allocate an uplink resource to the terminal device.

Data of services having different quality of service (Quality of Service, QoS) requirements is transmitted through different logical channels (Logical Channel, LCH). In the future 5G communications system, different logical channels may support different transmission parameter sets (which may include a subcarrier spacing (subcarrier spacing), a cyclic prefix (cyclic prefix, CP) length, transmission duration, and the like). A service having a QoS requirement needs to be transmitted by using an uplink grant corresponding to a transmission parameter set capable of supporting the corresponding QoS requirement. For example, when a logical channel has data to be sent and after a BSR is triggered, if the terminal device has an available uplink grant, the terminal device may pad a MAC PDU with the BSR and report the BSR to the network device. The network device schedules, based on the BSR, an uplink grant corresponding to a transmission parameter set of the logical channel to the terminal device. The terminal device may transmit the data of the logical channel by using the uplink grant. It can also be understood that after the terminal device receives an uplink grant allocated by the network device, only when a transmission parameter set, indicated by the uplink grant, for data transmission matches the logical channel, the terminal device can transmit the data of the logical channel by using the uplink grant. If the transmission parameter set does not match the logical channel, the terminal device cannot transmit the data of the logical channel by using the uplink grant.

However, there are a plurality of transmission parameter sets in the future 5G communications system, and a scheduling time varies with a transmission parameter set. This results in a problem that the network device cannot allocate, to a logical channel in a timely manner, an uplink resource that matches the logical channel, and consequently a delay requirement of data carried on the logical channel cannot be satisfied.

SUMMARY

Embodiments of this application provide a scheduling request processing method and a terminal device, to satisfy a QoS requirement of data carried on a logical channel.

According to a first aspect, an embodiment of this application provides a scheduling request processing method, where the method includes: determining, by a terminal device, whether there is a regular BSR associated with a first logical channel that is triggered and has not been canceled; and if a regular BSR associated with the first logical channel is triggered and has not been canceled, and the terminal device has no uplink resource available to transmit data of the first logical channel, and a first timer of the terminal device is not running, triggering, by the terminal device, an SR, where the first timer is configured to delay transmission of the SR.

According to the scheduling request processing method provided in the first aspect, when the terminal device has the BSR that is triggered and has not been canceled, the terminal device has no uplink resource available to transmit the data of the first logical channel associated with the BSR, and the first timer of the terminal device is not running, the terminal device may trigger the SR. Therefore, the uplink resource is more quickly requested by using the SR, to transmit the data of the first logical channel. This satisfies a QoS requirement of the data carried on the first logical channel and improves uplink scheduling performance.

Optionally, in a possible implementation of the first aspect, the regular BSR associated with the first logical channel is a BSR triggered by arrival of new data on the first logical channel.

Optionally, in a possible implementation of the first aspect, the regular BSR associated with the first logical channel is a BSR triggered by BSR retransmission timer expiry; and the first logical channel is a logical channel with a highest priority among all current second logical channels of the terminal device, where the second logical channel is a logical channel having data available for transmission or a logical channel having data available for transmission and belonging to a logical channel group.

Optionally, in a possible implementation of the first aspect, that the terminal device has no uplink resource available to transmit data of the first logical channel includes: the terminal device has, in a first time unit, no uplink resource available to transmit the data of the first logical channel, and/or the terminal device does not have a first-type uplink resource available to transmit the data of the first logical channel.

Optionally, in a possible implementation of the first aspect, that the terminal device has, in a first time unit, no uplink resource available to transmit the data of the first logical channel includes: the terminal device does not have any available uplink resource in the first time unit; or the terminal device has an available uplink resource in the first time unit, but a value of a parameter in a transmission parameter set of the uplink resource available for the terminal device in the first time unit is different from a value of a parameter in a transmission parameter set available for the first logical channel.

Optionally, in a possible implementation of the first aspect, that the terminal device does not have a first-type uplink resource available to transmit the data of the first logical channel includes: the terminal device does not have any available first-type uplink resource; or the terminal device has an available first-type uplink resource, but a value of a parameter in a transmission parameter set of the first-type uplink resource available for the terminal device is different from a value of a parameter in a transmission parameter set available for the first logical channel.

Optionally, in a possible implementation of the first aspect, the method further includes: determining, by the terminal device, an SR configuration corresponding to the first logical channel or the SR.

Optionally, in a possible implementation of the first aspect, the method further includes: for each first time unit, if the terminal device has, in the first time unit, no uplink resource available to transmit the data of the first logical channel and the terminal device has, in an overlapping time period between the first time unit and a second time unit, a physical resource that is to be used to transmit the SR and that is corresponding to the SR configuration, and an SR prohibit timer is not running, sending, by the terminal device, the SR on the physical resource.

According to the scheduling request processing method provided in the possible implementation, timely transmission of the SR can be ensured after the SR is triggered, and therefore the terminal device can more quickly request an uplink resource by using the SR, to transmit the data of the logical channel, thereby satisfying a QoS requirement of the data carried on the logical channel and improving uplink scheduling performance.

Optionally, in a possible implementation of the first aspect, the method further includes: for each first time unit, if the terminal device has, in the first time unit, no uplink resource available to transmit the data of the first logical channel and the terminal device has, in the first time unit, a physical resource that is to be used to transmit the SR and that is corresponding to the SR configuration, and an SR prohibit timer is not running, sending, by the terminal device, the SR on the physical resource.

Optionally, in a possible implementation of the first aspect, if the terminal device has the available uplink resource in the first time unit, but the value of the parameter in the transmission parameter set of the uplink resource available for the terminal device in the first time unit is different from the value of the parameter in the transmission parameter set available for the first logical channel, the method further includes: if the terminal device is configured to support parallel transmission on a first physical channel and a second physical channel, transmitting, by the terminal device, the data on the uplink resource available in the first time unit.

According to the scheduling request processing method provided in the possible implementation, that the terminal device is configured to support parallel transmission on a first physical channel and a second physical channel can improve data transmission efficiency and resource utilization.

Optionally, in a possible implementation of the first aspect, after the triggering, by the terminal device, an SR, the method further includes: if the terminal device has an uplink resource available to transmit the data of the first logical channel, canceling, by the terminal device, the SR.

According to the scheduling request processing method provided in the possible implementation, after the SR associated with the first logical channel has been triggered, the terminal device cancels the SR provided that the terminal device has the uplink resource available to transmit the data of the first logical channel. This saves resources, avoids a waste of resources, and reduces power consumption of the terminal device.

Optionally, in a possible implementation of the first aspect, that the terminal device has an uplink resource available to transmit the data of the first logical channel includes: the terminal device has an available uplink resource and a value of a parameter in a transmission parameter set of the uplink resource available for the terminal device is the same as the value of the parameter in the transmission parameter set available for the first logical channel, and a data unit transmitted by using the uplink resource available for the terminal device includes a buffer status report and the buffer status report includes at least a buffer size of a logical channel group to which the first logical channel belongs.

Optionally, in a possible implementation of the first aspect, that the terminal device has an uplink resource available to transmit the data of the first logical channel includes: the terminal device has an available uplink resource and a value of a parameter in a transmission parameter set of the uplink resource available for the terminal device is the same as the value of the parameter in the transmission parameter set available for the first logical channel, and the uplink resource available for the terminal device is capable of accommodating all data, available for transmission, of the first logical channel.

Optionally, in a possible implementation of the first aspect, that the terminal device has an uplink resource available to transmit the data of the first logical channel includes: the terminal device has an available uplink resource and a value of a parameter in a transmission parameter set of the uplink resource available for the terminal device is the same as the value of the parameter in the transmission parameter set available for the first logical channel, and the uplink resource available for the terminal device is capable of accommodating all data, available for transmission, of the first logical channel and all data, available for transmission, of another logical channel, where the another logical channel and the first logical channel are mapped to the same SR configuration.

According to a second aspect, an embodiment of this application provides a scheduling request processing method, where the method includes: if a terminal device has an SR associated with a first logical channel that is triggered and has not been canceled, determining, by the terminal device, an SR configuration corresponding to the first logical channel or the SR; and for each first time unit, if the terminal device has, in the first time unit, no uplink resource available to transmit data of the first logical channel and the terminal device has, in an overlapping time period between the first time unit and a second time unit, a physical resource that is to be used to transmit the SR and that is corresponding to the SR configuration, and an SR prohibit timer is not running, sending, by the terminal device, the SR on the physical resource.

According to the scheduling request processing method provided in the second aspect, after the SR associated with the first logical channel has been triggered, the terminal device determines the SR configuration corresponding to the first logical channel or the SR and may transmit the SR when a preset condition is satisfied. According to the scheduling request processing method provided in this embodiment, timely transmission of the SR can be ensured after the SR is triggered, and therefore the terminal device can more quickly request an uplink resource by using the SR, to transmit the data of the logical channel, thereby satisfying a QoS requirement of the data carried on the logical channel and improving uplink scheduling performance.

Optionally, in a possible implementation of the second aspect, the SR associated with the first logical channel is an SR triggered by a regular BSR that is triggered by arrival of new data on the first logical channel.

Optionally, in a possible implementation of the second aspect, the SR associated with the first logical channel is an SR triggered by a regular BSR that is triggered by BSR retransmission timer expiry; and the first logical channel is a logical channel with a highest priority among all current second logical channels of the terminal device, where the second logical channel is a logical channel having data available for transmission or a logical channel having data available for transmission and belonging to a logical channel group.

Optionally, in a possible implementation of the second aspect, that the terminal device has, in the first time unit, no uplink resource available to transmit data of the first logical channel includes: the terminal device does not have any available uplink resource in the first time unit; or the terminal device has an available uplink resource in the first time unit, but a value of a parameter in a transmission parameter set of the uplink resource available for the terminal device in the first time unit is different from a value of a parameter in a transmission parameter set available for the first logical channel.

Optionally, in a possible implementation of the second aspect, if the terminal device has the available uplink resource in the first time unit, but the value of the parameter in the transmission parameter set of the uplink resource available for the terminal device in the first time unit is different from the value of the parameter in the transmission parameter set available for the first logical channel, the method further includes: if the terminal device is configured to support parallel transmission on a first physical channel and a second physical channel, transmitting, by the terminal device, the data on the uplink resource available in the first time unit.

Optionally, in a possible implementation of the second aspect, the method further includes: if the terminal device has an uplink resource available to transmit the data of the first logical channel, canceling, by the terminal device, the SR.

Optionally, in a possible implementation of the second aspect, that the terminal device has an uplink resource available to transmit the data of the first logical channel includes: the terminal device has an available uplink resource and a value of a parameter in a transmission parameter set of the uplink resource available for the terminal device is the same as the value of the parameter in the transmission parameter set available for the first logical channel, and a data unit transmitted by using the uplink resource available for the terminal device includes a buffer status report and the buffer status report includes at least a buffer size of a logical channel group to which the first logical channel belongs.

Optionally, in a possible implementation of the second aspect, that the terminal device has an uplink resource available to transmit the data of the first logical channel includes: the terminal device has an available uplink resource and a value of a parameter in a transmission parameter set of the uplink resource available for the terminal device is the same as the value of the parameter in the transmission parameter set available for the first logical channel, and the uplink resource available for the terminal device is capable of accommodating all data, available for transmission, of the first logical channel.

Optionally, in a possible implementation of the second aspect, that the terminal device has an uplink resource available to transmit the data of the first logical channel includes: the terminal device has an available uplink resource and a value of a parameter in a transmission parameter set of the uplink resource available for the terminal device is the same as the value of the parameter in the transmission parameter set available for the first logical channel, and the uplink resource available for the terminal device is capable of accommodating all data, available for transmission, of the first logical channel and all data, available for transmission, of another logical channel, where the another logical channel and the first logical channel are mapped to the same SR configuration.

According to a third aspect, an embodiment of this application provides a scheduling request processing method, where the method includes: determining, by a terminal device, whether there is an SR associated with a first logical channel that is triggered and has not been canceled; and if an SR associated with the first logical channel is triggered and has not been canceled, and the terminal device has an uplink resource available to transmit data of the first logical channel, canceling, by the terminal device, the SR.

According to the scheduling request processing method provided in the third aspect, after the SR associated with the first logical channel has been triggered, the terminal device cancels the SR provided that the terminal device has the uplink resource available to transmit the data of the first logical channel. This saves resources, avoids a waste of resources, and reduces power consumption of the terminal device.

According to a fourth aspect, an embodiment of this application provides a terminal device, including a processing module, configured to: determine whether there is a regular BSR associated with a first logical channel that is triggered and has not been canceled; and if a regular BSR associated with the first logical channel is triggered and has not been canceled, and the terminal device has no uplink resource available to transmit data of the first logical channel, and a first timer of the terminal device is not running, trigger an SR, where the first timer is configured to delay transmission of the SR.

Optionally, in a possible implementation of the fourth aspect, the regular BSR associated with the first logical channel is a BSR triggered by arrival of new data on the first logical channel.

Optionally, in a possible implementation of the fourth aspect, the regular BSR associated with the first logical channel is a BSR triggered by BSR retransmission timer expiry; and the first logical channel is a logical channel with a highest priority among all current second logical channels of the terminal device, where the second logical channel is a logical channel having data available for transmission or a logical channel having data available for transmission and belonging to a logical channel group.

Optionally, in a possible implementation of the fourth aspect, that the terminal device has no uplink resource available to transmit data of the first logical channel includes: the terminal device has, in a first time unit, no uplink resource available to transmit the data of the first logical channel, and/or the terminal device does not have a first-type uplink resource available to transmit the data of the first logical channel.

Optionally, in a possible implementation of the fourth aspect, that the terminal device has, in a first time unit, no uplink resource available to transmit the data of the first logical channel includes: the terminal device does not have any available uplink resource in the first time unit; or the terminal device has an available uplink resource in the first time unit, but a value of a parameter in a transmission parameter set of the uplink resource available for the terminal device in the first time unit is different from a value of a parameter in a transmission parameter set available for the first logical channel.

Optionally, in a possible implementation of the fourth aspect, that the terminal device does not have a first-type uplink resource available to transmit the data of the first logical channel includes: the terminal device does not have any available first-type uplink resource; or the terminal device has an available first-type uplink resource, but a value of a parameter in a transmission parameter set of the first-type uplink resource available for the terminal device is different from a value of a parameter in a transmission parameter set available for the first logical channel.

Optionally, in a possible implementation of the fourth aspect, the processing module is further configured to determine an SR configuration corresponding to the first logical channel or the SR.

Optionally, in a possible implementation of the fourth aspect, the terminal device further includes a transceiver module, where the transceiver module is configured to: for each first time unit, if the terminal device has, in the first time unit, no uplink resource available to transmit the data of the first logical channel and the terminal device has, in an overlapping time period between the first time unit and a second time unit, a physical resource that is to be used to transmit the SR and that is corresponding to the SR configuration, and an SR prohibit timer is not running, send the SR on the physical resource.

Optionally, in a possible implementation of the fourth aspect, the terminal device further includes a transceiver module, where the transceiver module is configured to: for each first time unit, if the terminal device has, in the first time unit, no uplink resource available to transmit the data of the first logical channel and the terminal device has, in the first time unit, a physical resource that is to be used to transmit the SR and that is corresponding to the SR configuration, and an SR prohibit timer is not running, send the SR on the physical resource.

Optionally, in a possible implementation of the fourth aspect, that the terminal device has, in a first time unit, no uplink resource available to transmit the data of the first logical channel includes: the terminal device does not have any available uplink resource in the first time unit; or the terminal device has an available uplink resource in the first time unit, but a value of a parameter in a transmission parameter set of the uplink resource available for the terminal device in the first time unit is different from a value of a parameter in a transmission parameter set available for the first logical channel.

Optionally, in a possible implementation of the fourth aspect, if the terminal device has the available uplink resource in the first time unit, but the value of the parameter in the transmission parameter set of the uplink resource available for the terminal device in the first time unit is different from the value of the parameter in the transmission parameter set available for the first logical channel, the transceiver module is further configured to: if the terminal device is configured to support parallel transmission on a first physical channel and a second physical channel, transmit the data on the uplink resource available in the first time unit.

Optionally, in a possible implementation of the fourth aspect, the processing module is further configured to: if the terminal device has an uplink resource available to transmit the data of the first logical channel, cancel the SR.

Optionally, in a possible implementation of the fourth aspect, that the terminal device has an uplink resource available to transmit the data of the first logical channel includes: the terminal device has an available uplink resource and a value of a parameter in a transmission parameter set of the uplink resource available for the terminal device is the same as the value of the parameter in the transmission parameter set available for the first logical channel, and a data unit transmitted by using the uplink resource available for the terminal device includes a buffer status report and the buffer status report includes at least a buffer size of a logical channel group to which the first logical channel belongs.

Optionally, in a possible implementation of the fourth aspect, that the terminal device has an uplink resource available to transmit the data of the first logical channel includes: the terminal device has an available uplink resource and a value of a parameter in a transmission parameter set of the uplink resource available for the terminal device is the same as the value of the parameter in the transmission parameter set available for the first logical channel, and the uplink resource available for the terminal device is capable of accommodating all data, available for transmission, of the first logical channel.

Optionally, in a possible implementation of the fourth aspect, that the terminal device has an uplink resource available to transmit the data of the first logical channel includes: the terminal device has an available uplink resource and a value of a parameter in a transmission parameter set of the uplink resource available for the terminal device is the same as the value of the parameter in the transmission parameter set available for the first logical channel, and the uplink resource available for the terminal device is capable of accommodating all data, available for transmission, of the first logical channel and all data, available for transmission, of another logical channel, where the another logical channel and the first logical channel are mapped to the same SR configuration.

According to a fifth aspect, an embodiment of this application provides a terminal device, including: a processing module, configured to: if the terminal device has a scheduling request SR associated with a first logical channel that is triggered and has not been canceled, determine an SR configuration corresponding to the first logical channel or the SR; and a transceiver module, configured to: for each first time unit, if the terminal device has, in the first time unit, no uplink resource available to transmit data of the first logical channel and the terminal device has, in an overlapping time period between the first time unit and a second time unit, a physical resource that is to be used to transmit the SR and that is corresponding to the SR configuration, and an SR prohibit timer is not running, send the SR on the physical resource.

Optionally, in a possible implementation of the fifth aspect, the SR associated with the first logical channel is an SR triggered by a regular buffer status report BSR that is triggered by arrival of new data on the first logical channel.

Optionally, in a possible implementation of the fifth aspect, the SR associated with the first logical channel is an SR triggered by a regular BSR that is triggered by BSR retransmission timer expiry; and the first logical channel is a logical channel with a highest priority among all current second logical channels of the terminal device, where the second logical channel is a logical channel having data available for transmission or a logical channel having data available for transmission and belonging to a logical channel group.

Optionally, in a possible implementation of the fifth aspect, that the terminal device has, in the first time unit, no uplink resource available to transmit data of the first logical channel includes: the terminal device does not have any available uplink resource in the first time unit; or the terminal device has an available uplink resource in the first time unit, but a value of a parameter in a transmission parameter set of the uplink resource available for the terminal device in the first time unit is different from a value of a parameter in a transmission parameter set available for the first logical channel.

Optionally, in a possible implementation of the fifth aspect, if the terminal device has the available uplink resource in the first time unit, but the value of the parameter in the transmission parameter set of the uplink resource available for the terminal device in the first time unit is different from the value of the parameter in the transmission parameter set available for the first logical channel, the transceiver module is further configured to: if the terminal device is configured to support parallel transmission on a first physical channel and a second physical channel, transmit the data on the uplink resource available in the first time unit.

Optionally, in a possible implementation of the fifth aspect, the processing module is further configured to: if the terminal device has an uplink resource available to transmit the data of the first logical channel, cancel the SR.

Optionally, in a possible implementation of the fifth aspect, that the terminal device has an uplink resource available to transmit the data of the first logical channel includes: the terminal device has an available uplink resource and a value of a parameter in a transmission parameter set of the uplink resource available for the terminal device is the same as the value of the parameter in the transmission parameter set available for the first logical channel, and a data unit transmitted by using the uplink resource available for the terminal device includes a buffer status report and the buffer status report includes at least a buffer size of a logical channel group to which the first logical channel belongs.

Optionally, in a possible implementation of the fifth aspect, that the terminal device has an uplink resource available to transmit the data of the first logical channel includes: the terminal device has an available uplink resource and a value of a parameter in a transmission parameter set of the uplink resource available for the terminal device is the same as the value of the parameter in the transmission parameter set available for the first logical channel, and the uplink resource available for the terminal device is capable of accommodating all data, available for transmission, of the first logical channel.

Optionally, in a possible implementation of the fifth aspect, that the terminal device has an uplink resource available to transmit the data of the first logical channel includes: the terminal device has an available uplink resource and a value of a parameter in a transmission parameter set of the uplink resource available for the terminal device is the same as the value of the parameter in the transmission parameter set available for the first logical channel, and the uplink resource available for the terminal device is capable of accommodating all data, available for transmission, of the first logical channel and all data, available for transmission, of another logical channel, where the another logical channel and the first logical channel are mapped to the same SR configuration.

According to a sixth aspect, an embodiment of this application provides a terminal device, including a processing module, configured to determine whether there is a scheduling request SR associated with a first logical channel that is triggered and has not been canceled exists; and if an SR associated with the first logical channel is triggered and has not been canceled, and the terminal device has an uplink resource available to transmit data of the first logical channel, cancel the SR.

According to a seventh aspect, an embodiment of this application provides a terminal device, where the terminal device includes a processor, a memory, and a transceiver, where the memory is configured to store an instruction, the transceiver is configured to communicate with other devices, and the processor is configured to execute the instruction stored in the memory, so that the terminal device performs the scheduling request processing method provided in the first aspect, the second aspect, or the third aspect.

With reference to the first aspect and the possible implementations of the first aspect, the second aspect and the possible implementations of the second aspect, the third aspect and the possible implementations of the third aspect, the fourth aspect and the possible implementations of the fourth aspect, the fifth aspect and the possible implementations of the fifth aspect, the sixth aspect and the possible implementations of the sixth aspect, and the seventh aspect and the possible implementations of the seventh aspect, the SR configuration includes at least one of the following parameters: an identifier of the SR configuration, an SR prohibit timer, a maximum quantity of SR transmissions, and a parameter used to determine a location of a physical resource to be used to transmit the SR. The first-type uplink resource is an uplink resource configured by a network device for the terminal device by using radio resource control layer signaling, or an uplink resource that is configured by the network device for the terminal device by using radio resource control layer signaling and that is activated by using physical layer signaling or Media Access Control layer signaling.

According to an eighth aspect, an embodiment of this application provides a storage medium, including a readable storage medium and a computer program, where the computer program is used to implement the scheduling request processing method provided in the first aspect, the second aspect, or the third aspect.

According to a ninth aspect, an embodiment of this application provides a program product, where the program product includes a computer program (namely, an executable instruction), and the computer program is stored in a readable storage medium. At least one processor of a terminal device may read the computer program from the readable storage medium, and the at least one processor executes the computer program, so that the terminal device implements the scheduling request processing method provided in the first aspect, the second aspect, or the third aspect.

A tenth aspect of this application provides a chip, where the chip may be applied to a terminal device, and the chip includes: at least one communications interface, at least one processor, and at least one memory, where the communications interface, the memory, and the processor are mutually connected by using a bus; and the processor invokes a computer program stored in the memory, to perform the scheduling request processing method provided in the first aspect, the second aspect, or the third aspect of this application.

The embodiments of this application provide a scheduling request processing method and a terminal device. When a terminal device has a BSR that is triggered and has not been canceled, the terminal device has no uplink resource available to transmit data of a first logical channel associated with the BSR, and a first timer of the terminal device is not running, the terminal device may trigger an SR. Therefore, an uplink resource is more quickly requested by using the SR, to transmit the data of the logical channel, thereby satisfying a QoS requirement of the data carried on the logical channel.

DESCRIPTION OF EMBODIMENTS

Figure 1:
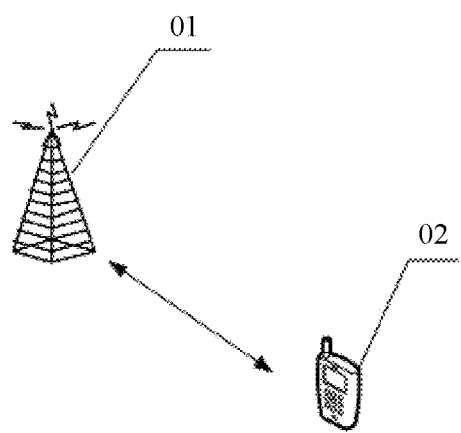
FIG. 1 is a framework diagram of a communications system according to an embodiment of this application.

FIG. 1 is a framework diagram of a communications system according to an embodiment of this application. As shown in FIG. 1, the communications system includes a network device 01 and a terminal device 02. The network device 01 and the terminal device 02 may perform uplink/downlink communication.

The network device 01 may be any devices managing a wireless network resource or any wireless access point. For example, the network device 01 may be a base transceiver station (Base Transceiver Station, BTS) in Global System for Mobile Communications (Global System of Mobile communication, GSM) or Code Division Multiple Access (Code Division Multiple Access, CDMA), a NodeB (NodeB, NB) in Wideband Code Division Multiple Access (Wideband Code Division Multiple Access, WCDMA), or an evolved NodeB (Evolutional Node B, eNB or eNodeB) in Long Term Evolution (Long Term Evolution, LTE), or a relay node or an access point, or a 5G NodeB (g NodeB, gNB) or a wireless transceiver device (NeXt Node, NX) in a future 5G communications system. This is not limited herein.

The terminal device 02 may be a wireless terminal such as a mobile phone or a tablet computer. The wireless terminal includes a device that provides voice and/or data services to users. The terminal device may alternatively be a handheld device, an in-vehicle device, a wearable device, or a computing device that has a wireless connection function, or any form of user equipment UE, a mobile station (Mobile Station, MS), and a terminal (terminal). This embodiment of this application imposes no limitation thereto.

In an LTE communications system, an LTE evolved communications system, the future 5G communications system, and another future communications system, the terminal device may request, by using a BSR and a scheduling request (scheduling request, SR), the network device to perform uplink scheduling. Specifically, the terminal device may send the BSR or the SR to the network device. Then, the network device may send an uplink grant (UL grant) to the terminal device based on the BSR or the SR sent by the terminal device, to complete uplink scheduling.

The following briefly describes BSR triggering, BSR retransmission, SR triggering, SR transmission, and SR cancellation in an existing uplink scheduling process by using the LTE communications system as an example.

1. BSR Triggering

In the LTE communications system, there are a plurality of types of BSRs such as a regular BSR (regular BSR), a periodic BSR (Periodic BSR), and a padding BSR (Padding BSR). Herein, only triggering of the regular BSR is described.

Generally, there are the following three conditions for triggering the regular BSR.

(1) An uplink data buffer (buffer) of the terminal device is empty and new data arrives.

When there is no uplink data available for transmission for any of all logical channels belonging to all logical channel groups (Logical Channel Group, LCG), if uplink data for a logical channel belonging to an LCG becomes available at this time for transmission, the terminal device triggers the regular BSR.

(2) Data with a higher priority arrives.

If data needs to arrive on a logical channel, belonging to a logical channel group, of the terminal device with a higher priority than a logical channel having data currently available for transmission, the terminal device triggers the regular BSR.

(3) When a BSR retransmission timer expires, and data is available for transmission for any of logical channels belonging to an LCG of the terminal device, the regular BSR is triggered.

2. BSR Retransmission

In the LTE communications system, a BSR retransmission mechanism is introduced to prevent the network device from incorrectly determining a buffer status of the terminal device due to a loss of the BSR or inconsistency between a transmission order and a receiving order of the BSR. Details are as follows:

A BSR retransmission timer is maintained on the terminal device side. Duration of the timer may be configured by the network device.

When a BSR is sent, the BSR retransmission timer is started or restarted.

When the terminal device receives an uplink grant used for new data transmission, the terminal device restarts the BSR retransmission timer.

When the BSR retransmission timer expires, the terminal device triggers the regular BSR provided that data is available for transmission for any of logical channels of the terminal device that belong to an LCG.

3. SR Triggering

In the LTE communications system, after the regular BSR is triggered, the regular BSR is considered as pending (pending).

In one transmission time interval (Time Transmission Interval, TTI), when the terminal device has a pending BSR, if the terminal device has an uplink resource for new data transmission in the TTI, the terminal device may transmit the BSR by using the uplink resource. In this case, an SR is not triggered.

If the terminal device does not have the uplink resource, the terminal device further triggers an SR.

4. SR Transmission

After the SR is triggered, the SR is considered as pending (pending). If the terminal device does not have an uplink shared channel (Uplink Shared Channel, UL-SCH) resource in a TTI, the terminal device determines whether a physical uplink control channel (Physical Uplink Control Channel, PUCCH) resource configured by the network device for the terminal device for transmitting the SR exists in the current TTI. If the PUCCH resource exists and an SR prohibit timer corresponding to the SR is not running, a Media Access Control (Media Access Control, MAC) layer of the terminal device performs the following operations:

instructing a physical layer to transmit the SR;
incrementing a variable used to record a quantity of SR transmissions by 1; and
starting the SR prohibit timer.

5. SR Cancellation

When the following conditions are satisfied, the pending SR is canceled.

(1) When a transmitted MAC PDU includes a BSR and the BSR includes a buffer status up to (and including) the last event that triggered a BSR, the SR is canceled.

(2) When a transmitted MAC PDU includes data available for transmission, the SR is canceled.

There is only one transmission time interval TTI in the LTE communications system. Therefore, regardless of whether the network device schedules the uplink grant based on the BSR sent by the terminal device or based on the SR sent by the terminal device, scheduling periods are the same, and the terminal device may obtain, in a timely manner, an uplink resource available to transmit uplink data.

In the future 5G communications system, data is transmitted on a per-time-unit basis in time domain. A time unit may be a subframe, a transmission time interval (one transmission time interval is equal to a sum of lengths of several subframes, or a sum of several transmission time intervals is equal to a length of one subframe), a slot (slot), a combination of a plurality of slots, a mini-slot (mini-slot), a combination of a plurality of mini-slots, a combination of a mini-slot and a slot, a time domain symbol, a plurality of time domain symbols, or the like. Apparently, there are time units of a plurality of lengths in the future 5G communications system. A length of a time unit is related to a subcarrier spacing in frequency domain. A smaller subcarrier spacing indicates a time domain symbol of a longer length. In other words, there are a plurality of transmission parameter sets in the future 5G communications system.

In the future 5G communications system, there is a problem that a network device cannot allocate, to a logical channel of a terminal device in a timely manner, an uplink resource matching the logical channel. For example, the terminal device transmits a BSR by using an UL grant corresponding to a first transmission parameter set, to report uplink scheduling information of a logical channel to the network device, and the UL grant corresponding to the first transmission parameter set cannot satisfy a QoS requirement of data carried on the logical channel. Consequently, a delay requirement of the data carried on the logical channel and/or a reliability requirement of control signaling for requesting a resource cannot be satisfied. This problem probably occurs in any stage of an uplink scheduling process, such as BSR retransmission, SR triggering, or SR transmission.

A scheduling request processing method provided in the embodiments of this application may be applicable to the future 5G communications system and the another future communications system, and is mainly applied to uplink data scheduling. The method is used to request an uplink resource from the network device in a manner that can satisfy a QoS requirement of a logical channel.

The following briefly describes related concepts in the data scheduling process in the embodiments of this application.

QoS: A terminal device may perform a plurality of services simultaneously, and each service has a corresponding QoS requirement. A service having a QoS requirement needs to be transmitted by using an uplink grant corresponding to a transmission parameter set capable of supporting the corresponding QoS requirement.

Protocol stack configuration manner: A protocol stack (Protocol Stack) is a sum of protocol layers in a network and vividly reflects a file transfer process in the network, to be specific, from an upper layer protocol to an underlying protocol, and then from the underlying protocol to the upper layer protocol. As an example instead of limitation, in the embodiments of this application, a protocol stack used for wireless communication may include at least one of the following protocol layers or a combination of a plurality of the following protocol layers: a Service Data Adaptation Protocol (Service Data Adaptation Protocol, SDAP) layer, a Packet Data Convergence Protocol (Packet Data Convergence Protocol, PDCP) layer, a Radio Link Control (Radio Link Control, RLC) layer, a Media Access Control (Media Access Control, MAC) layer, a physical (Physical) layer, and a radio resource control (Radio Resource Control, RRC) layer. Each protocol layer may have various protocol entities and various defined channel resources.

Logical channel: The MAC layer provides data transfer services on the logical channel, and the data transfer services indicate what is carried on the logical channel. The network device configures an available/mappable transmission parameter set of the logical channel for the terminal device.

Logical channel group LCG: The LCG is a set including a plurality of logical channels and is usually configured by the network device.

Uplink resource: The uplink resource may be understood as an uplink transmission channel UL-SCH resource or a physical uplink channel PUSCH resource, and is used to transmit data of the terminal device.

Physical resource: The physical resource is a resource at the physical layer and includes a time domain resource and a frequency domain resource.

Time unit: The time unit is a time granularity for transmitting upper-layer data and/or physical control signaling in time domain.

Transmission parameter set: A parameter in an available/mappable transmission parameter set of a logical channel may include but is not limited to at least one of the following: a subcarrier spacing, a cyclic prefix length, uplink resource transmission duration, an interval between a moment at which control signaling for scheduling the uplink resource is transmitted and a moment at which data is transmitted by using the scheduled uplink resource, and a serving cell of the terminal device corresponding to the uplink resource.

SR configuration: The network device configures, for the terminal device, an available/mappable transmission parameter set of each logical channel of the terminal device and an available/mappable SR configuration of the logical channel. One logical channel may be associated with one or more SR configurations. For the concept of the SR configuration, there may be the following cases:

(1) The SR configuration includes an identifier of the SR configuration, an SR prohibit timer, and a maximum quantity of SR transmissions, and also includes a parameter used to determine a location of a physical resource to be used to transmit an SR. In this case, a logical channel is associated with/mapped to at least one SR configuration.

(2) The SR configuration includes an identifier of the SR configuration, an SR prohibit timer, and a maximum quantity of SR transmissions, but does not include a parameter used to determine a location of a physical resource to be used to transmit an SR. The parameter used to determine the location of the physical resource to be used to transmit the SR is included in another SR-related configuration. For example, the SR-related configuration may become an SR resource configuration.

In this case, a logical channel is associated with/mapped to at least one SR configuration, and an SR configuration is further associated with/mapped to at least one SR resource configuration.

Based on an SR configuration corresponding to the SR sent by the terminal device (if case 1 applies) or an SR resource configuration corresponding to the SR sent by the terminal device (if case 2 applies), and an association/mapping relationship between the logical channel and the SR configuration or the SR resource configuration, the network device may know an uplink grant corresponding to which transmission parameter set currently needed by the terminal device to transmit data.

In addition, in the embodiments of this application, the following technical terms are interchangeable in terms of language description: available/mappable, mapped/associated, and uplink resource/uplink grant.

The following uses specific embodiments to describe in detail the technical solutions in this application and how the foregoing technical problem is resolved in the technical solutions in this application. The following several specific embodiments may be mutually combined, and same or similar concepts or processes may not be repeatedly described in some embodiments.

In the specification, claims, and accompanying drawings of this application, the terms "first", "second", "third", "fourth", and so on (if any) are intended to distinguish between similar objects but do not necessarily indicate a specific order.

Embodiment 1

This embodiment is applied to an SR triggering scenario in an uplink scheduling process and relates to how to request an uplink resource from a network device, so as to satisfy a QoS requirement of data of a logical channel.

Figure 2:
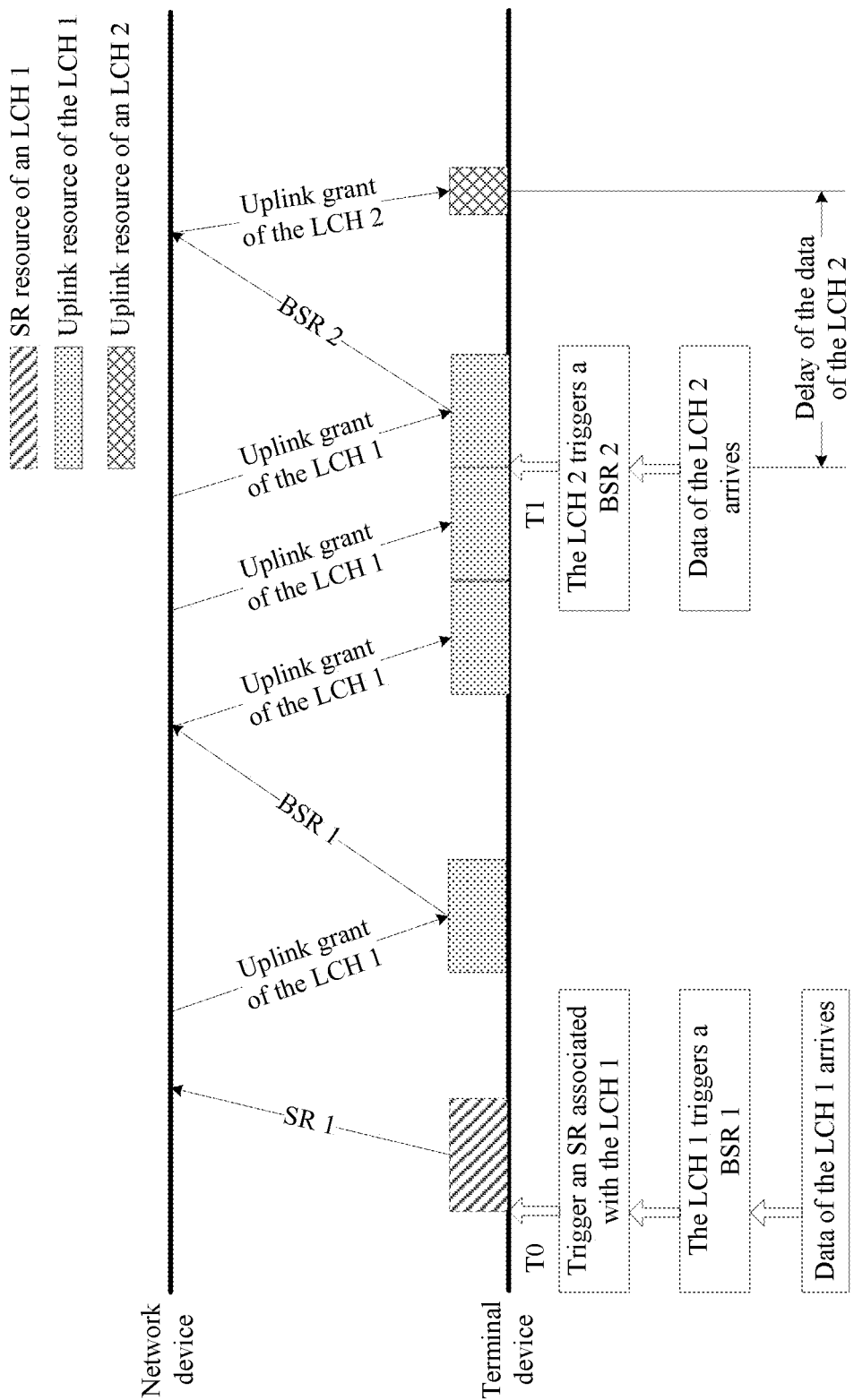
FIG. 2 is a schematic diagram of a scenario in which an SR cannot be triggered.

FIG. 2 is a schematic diagram of a scenario in which an SR cannot be triggered. It is assumed that a terminal device is configured with two logical channels: a logical channel 1 (LCH 1) and a logical channel 2 (LCH 2).

(1) A value of an available/mappable transmission parameter set of the LCH 1 that is configured by the network device for the terminal device is a first value set, and a mapped/associated SR configuration configured by the network device for the LCH 1 is a first SR configuration.

(2) A value of an available/mappable transmission parameter set of the LCH 2 that is configured by the network device for the terminal device is a second value set, and a mapped/associated SR configuration configured by the network device for the LCH 2 is a second SR configuration.

(3) A priority of the LCH 2 is higher than that of the LCH 1.

As shown in FIG. 2, an uplink scheduling process is as follows:

At a moment T0, arrival of data on the LCH 1 triggers a regular BSR, marked as BSR 1. Because the terminal device has no available uplink resource, the BSR 1 may trigger an SR associated with the LCH 1, marked as SR 1. The terminal device reports a buffer size (buffer size) of an LCG including the LCH 1 to the network device. Afterwards, the network device starts to schedule, to the terminal device, an uplink resource/uplink grant corresponding to a transmission parameter set whose value is the first value set.

At a moment T1, arrival of data on the LCH 2 triggers a regular BSR, marked as BSR 2. At the moment T1, the terminal device has the uplink grant that is scheduled by the network device and that is corresponding to the transmission parameter set whose value is the first value set. Therefore, the terminal device may report, to the network device by using the uplink grant, a buffer size of an LCG including the LCH 2. After receiving the BSR 2, the network device may start, based on the BSR 2, to schedule, to the terminal device, an uplink grant corresponding to a transmission parameter set whose value is the second value set. A delay of the data of the LCH 2 is a time period from the moment T1 to a moment at which the terminal device receives the uplink grant that is sent by the network device and that is corresponding to the transmission parameter set whose value is the second value set. The delay is very large.

During a time period from the moment T1 to a moment at which the network device receives the BSR 2 and sends, to the terminal device, the uplink grant corresponding to the transmission parameter set whose value is the second value set, because the terminal device always has the uplink grant that is scheduled by the network device and that is corresponding to the transmission parameter set whose value is the first value set, namely, an uplink grant scheduled for transmission of the data of the LCH 1, based on an existing condition for triggering an SR, the terminal device cannot trigger an SR associated with the LCH 2.

Apparently, in this scenario, although the terminal device reports the BSR 2, the value of the available/mappable transmission parameter set of the LCH 1 is the first value set, and the value of the available/mappable transmission parameter set of the LCH 2 is the second value set, and they are different. Transmitting the BSR 2 by using the uplink grant corresponding to the transmission parameter set whose value is the first value set to request an uplink resource cannot satisfy a delay requirement of uplink data transmission of the LCH 2, and the terminal device cannot trigger the SR associated with the LCH 2, and therefore cannot request the uplink resource more quickly by sending the SR associated with the LCH 2. In another aspect, transmitting the BSR 2 by using the uplink grant corresponding to the transmission parameter set whose value is the first value set to request the uplink resource for the LCH 2 probably also cannot satisfy a requirement of the LCH 2 on reliability of control signaling for requesting the uplink resource.

This embodiment provides a scheduling request processing method, to resolve a technical problem that a delay requirement of data carried on a logical channel and/or a requirement on reliability of control signaling for requesting a resource cannot be satisfied when a BSR is triggered and a terminal device has an uplink resource available to transmit the BSR, but the uplink resource does not match a transmission parameter of the logical channel on which the BSR is triggered.

Figure 3:
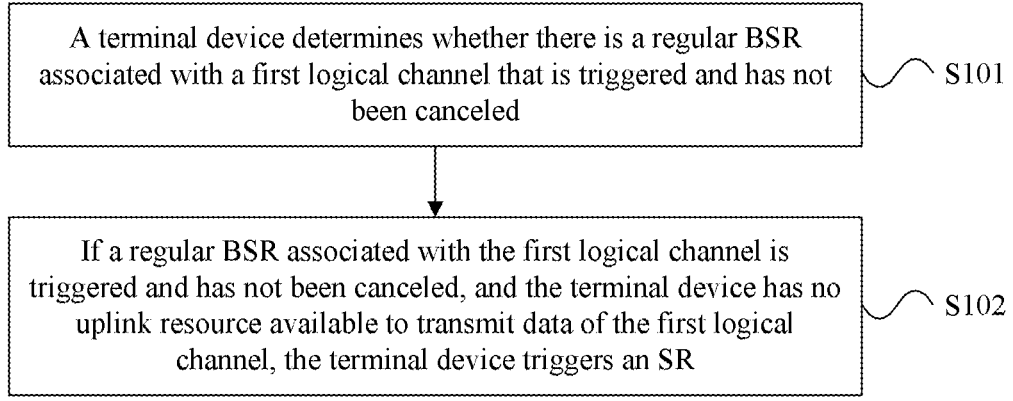
FIG. 3 is a flowchart of a scheduling request processing method according to Embodiment 1 of this application.

FIG. 3 is a flowchart of a scheduling request processing method according to Embodiment 1 of this application. The scheduling request processing method provided in this embodiment is performed by a terminal device. As shown in FIG. 3, the scheduling request processing method provided in this embodiment may include the following steps.

S101: The terminal device determines whether there is a regular BSR associated with a first logical channel that is triggered and has not been canceled.

Specifically, after the regular BSR is triggered, the regular BSR may be considered as pending (pending) until it is canceled. The first logical channel is a logical channel associated with the triggered regular BSR. There are many scenarios in which the regular BSR is triggered. The first logical channel may be or may not be the logical channel that directly triggers the regular BSR. In different scenarios in which the regular BSR is triggered, first logical channels may be different.

When it is determined that there is a regular BSR associated with the first logical channel that is triggered and has not been canceled, S102 is performed.

S102: If a regular BSR associated with the first logical channel is triggered and has not been canceled, and the terminal device has no uplink resource available to transmit data of the first logical channel, the terminal device triggers an SR.

Specifically, when two conditions are satisfied at the same time, an SR associated with the first logical channel may be triggered. The two conditions are: (1) There is a pending BSR associated with the first logical channel; (2) there is no uplink resource available to transmit the data of the first logical channel. The data of the first logical channel is data to be transmitted by the terminal device through the first logical channel or is referred to as data available for transmission (available data for transmission). The terminal device has no uplink resource available to transmit the data of the first logical channel. The "uplink resource" herein is for the "first logical channel". If there is an uplink resource, whether the uplink resource can be used to transmit the data of the first logical channel needs to be determined. In another aspect, the "uplink resource" herein may be understood as an UL-SCH resource and/or a PUSCH resource.

Optionally, that the terminal device triggers an SR in S102 may further include a condition: A first timer of the terminal device is not running and the first timer is configured to delay transmission of the SR. In this case, if the regular BSR associated with the first logical channel is triggered and has not been canceled, the terminal device has no uplink resource available to transmit the data of the first logical channel, and the first timer of the terminal device is not running, the terminal device may trigger the SR.

In this implementation, when three conditions are satisfied at the same time, the SR associated with the first logical channel may be triggered. The three conditions are: (1) There is a pending BSR associated with the first logical channel; (2) there is no uplink resource available to transmit the data of the first logical channel; and (3) the first timer is not running. In other words, when the first timer runs, the SR cannot be triggered.

Figure 4:
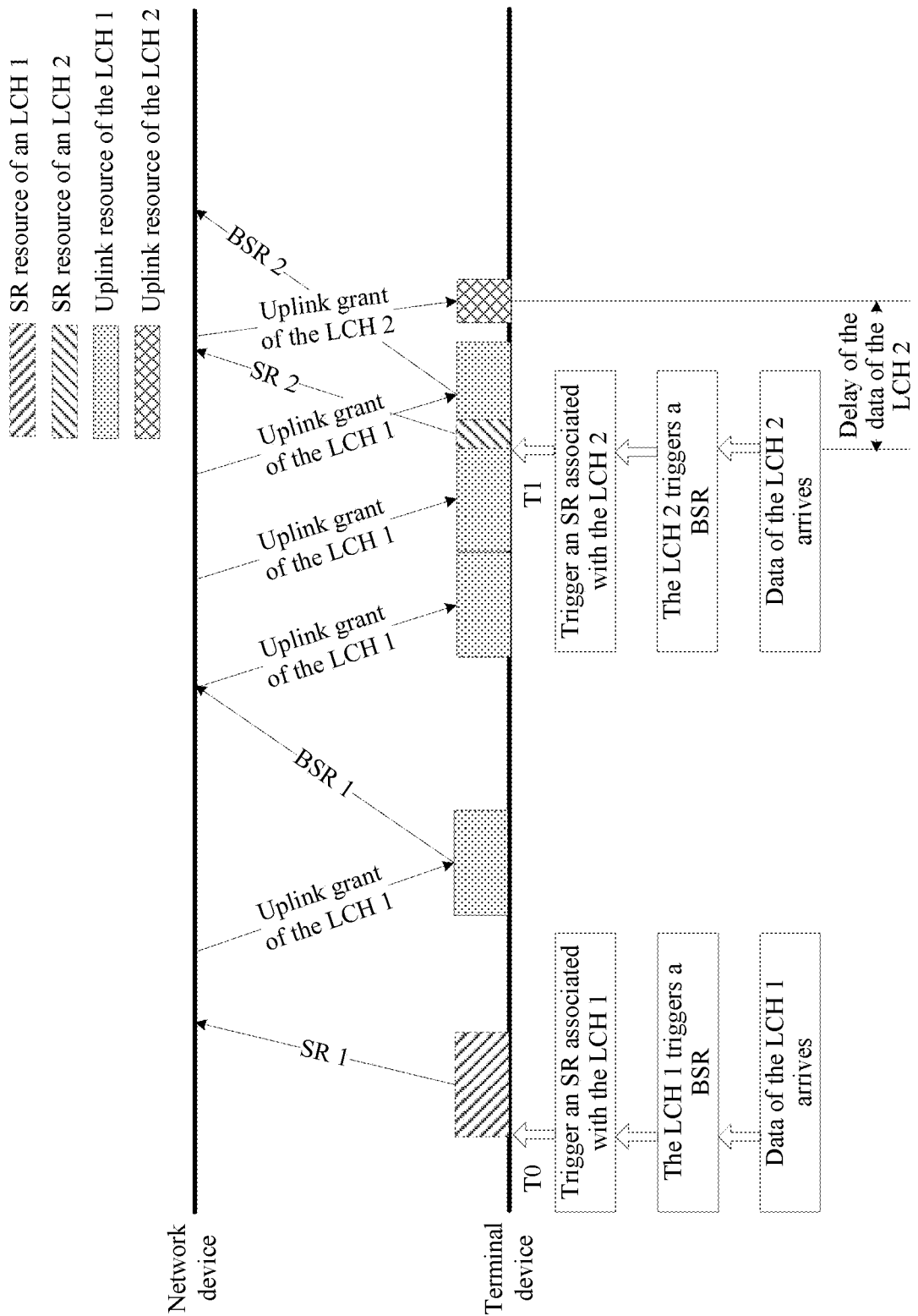
FIG. 4 is a schematic diagram of a scenario in which an SR is triggered according to Embodiment 1 of this application.

In the scenario shown in FIG. 2, at the moment T1, arrival of data on the LCH 2 triggers a regular BSR, marked as BSR 2. The first condition is satisfied. The LCH 2 is the first logical channel. At the moment T1, the terminal device has the uplink grant that is scheduled by the network device and that is corresponding to the transmission parameter set whose value is the first value set, but the value of the available/mappable transmission parameter set of the LCH 2 is the second value set. Although there is the uplink grant, the uplink grant is unavailable for the LCH 2. The second condition is satisfied. It is assumed that the first timer is not running. The third condition is satisfied. Therefore, the terminal device may trigger an SR associated with the LCH 2, marked as SR 2. For a specific uplink scheduling process, refer to FIG. 4. FIG. 4 is a schematic diagram of a scenario in which an SR is triggered according to Embodiment 1 of this application. After receiving the SR 2, the network device may quickly start, based on the SR 2, to schedule, to the terminal device, an uplink grant corresponding to the transmission parameter set whose value is the second value set. A delay of the data of the LCH 2 is a time period from the moment T1 to a moment at which the terminal device receives the uplink grant that is sent by the network device and that is corresponding to the transmission parameter set whose value is the second value set. The delay is much shorter than that in FIG. 2, a delay requirement of uplink data transmission of the LCH 2 is satisfied, and a requirement of the LCH 2 on reliability of control signaling for requesting the uplink resource is satisfied.

Apparently, when the terminal device has the BSR that is triggered and has not been canceled, the terminal device has no uplink resource available to transmit the data of the first logical channel associated with the BSR, and the first timer of the terminal device is not running, the terminal device may trigger the SR. Therefore, the uplink resource is more quickly requested by using the SR, to transmit the data of the first logical channel. This satisfies a QoS requirement of the data carried on the first logical channel and improves uplink scheduling performance.

Optionally, that the terminal device has no uplink resource available to transmit data of the first logical channel may include:

the terminal device has, in a first time unit, no uplink resource available to transmit the data of the first logical channel, and/or the terminal device does not have a first-type uplink resource available to transmit the data of the first logical channel.

The first-type uplink resource is an uplink resource configured by the network device for the terminal device by using radio resource control layer signaling, or an uplink resource that is configured by the network device for the terminal device by using radio resource control layer signaling and that is activated by using physical layer signaling or Media Access Control layer signaling.

The terminal device has, in the first time unit, no uplink resource available to transmit the data of the first logical channel. The "uplink resource" herein may include a first-type uplink resource and a second-type uplink resource. The second-type uplink resource may include an uplink grant that is scheduled on a PDCCH scrambled by the network device by using a terminal device-specific identifier, for example, a cell-radio network temporary identifier (Cell-Radio Network Temporary Identifier, C-RNTI). In another aspect, the "uplink resource" herein may be understood as an UL-SCH resource and/or a PUSCH resource.

Optionally, that the terminal device has, in a first time unit, no uplink resource available to transmit the data of the first logical channel may include:

the terminal device does not have any available uplink resource in the first time unit; or the terminal device has an available uplink resource in the first time unit, but a value of a parameter in a transmission parameter set of the uplink resource available for the terminal device in the first time unit is different from a value of a parameter in a transmission parameter set available for the first logical channel.

Specifically, the terminal device does not have any available uplink resource in the first time unit, or the terminal device has an available uplink resource in the first time unit. The "uplink resource" herein is for the "terminal device", and may include a first-type uplink resource and a second-type uplink resource. It can be understood that the "uplink resource available for the terminal device" is different from the "uplink resource available to transmit the data of the first logical channel". When the value of the parameter in the transmission parameter set of the uplink resource available for the terminal device in the first time unit is different from the value of the parameter in the transmission parameter set available for the first logical channel, the uplink resource is available for the "terminal device", but is unavailable for the "first logical channel". In another aspect, the "uplink resource" herein may include an UL-SCH and a PUSCH.

The transmission parameter set may include a plurality of parameters. Transmission parameter sets are different provided that one parameter in the sets has different values.

Optionally, that the terminal device does not have a first-type uplink resource available to transmit the data of the first logical channel may include:

the terminal device does not have any available first-type uplink resource; or the terminal device has an available first-type uplink resource, but a value of a parameter in a transmission parameter set of the first-type uplink resource available for the terminal device is different from a value of a parameter in a transmission parameter set available for the first logical channel.

Specifically, the terminal device does not have any available first-type uplink resource, or the terminal device has the available first-type uplink resource. Herein, only the "first-type uplink resource" is used. It can be understood that the "first-type uplink resource available for the terminal device" is different from the "first-type uplink resource available to transmit the data of the first logical channel". In another aspect, the "uplink resource" herein may include an UL-SCH and a PUSCH.

To sum up, that the terminal device has no uplink resource available to transmit data of the first logical channel may include at least the following implementations:

First implementation: The terminal device does not have any available uplink resource in the first time unit.

Second implementation: The terminal device has an available uplink resource in the first time unit, but a value of a parameter in a transmission parameter set of the uplink resource available for the terminal device in the first time unit is different from a value of a parameter in a transmission parameter set available for the first logical channel.

Third implementation: The terminal device does not have any available first-type uplink resource.

Fourth implementation: The terminal device has an available first-type uplink resource, but a value of a parameter in a transmission parameter set of the first-type uplink resource available for the terminal device is different from a value of a parameter in a transmission parameter set available for the first logical channel.

Fifth implementation: The terminal device does not have any available uplink resource in the first time unit, and the terminal device does not have any available first-type uplink resource.

Sixth implementation: The terminal device does not have any available uplink resource in the first time unit; in addition, the terminal device has an available first-type uplink resource, but a value of a parameter in a transmission parameter set of the first-type uplink resource available for the terminal device is different from a value of a parameter in a transmission parameter set available for the first logical channel.

Seventh implementation: The terminal device has an available uplink resource in the first time unit, but a value of a parameter in a transmission parameter set of the uplink resource available for the terminal device in the first time unit is different from a value of a parameter in a transmission parameter set available for the first logical channel; in addition, the terminal device does not have any available first-type uplink resource.

Eighth implementation: The terminal device has an available uplink resource in the first time unit, but a value of a parameter in a transmission parameter set of the uplink resource available for the terminal device in the first time unit is different from a value of a parameter in a transmission parameter set available for the first logical channel; in addition, the terminal device has an available first-type uplink resource, but a value of a parameter in a transmission parameter set of the first-type uplink resource available for the terminal device is different from a value of a parameter in a transmission parameter set available for the first logical channel.

Optionally, if the terminal device does not have the uplink resource available to transmit the data of the first logical channel, when the regular BSR associated with the first logical channel can be included in a MAC PDU to be transmitted by using the uplink resource, the regular BSR associated with the first logical channel is also not canceled. In this case, the terminal device has an available uplink resource in the first time unit, but a value of a parameter in a transmission parameter set of the uplink resource available for the terminal device in the first time unit is different from a value of a parameter in a transmission parameter set available for the first logical channel. Alternatively, the terminal device has an available first-type uplink resource, but a value of a parameter in a transmission parameter set of the first-type uplink resource available for the terminal device is different from a value of a parameter in a transmission parameter set available for the first logical channel.

It should be noted that there may be a plurality of implementations for the first time unit. The following describes in detail the first time unit by using a specific example. Certainly, the first time unit in this embodiment may include but is not limited to the following implementations. In addition, another time unit in this embodiment is similar to the first time unit, and may include but is not limited to the following implementations.

First implementation: The time unit is default/predefined duration. For example, the duration may be duration of a slot (Slot) including symbol duration corresponding to a reference subcarrier spacing. The reference subcarrier spacing may be, for example, a subcarrier spacing of 15 kHz.

Second implementation: The time unit is transmission duration corresponding to the uplink resource received by the terminal device. Different uplink resources probably use different subcarrier spacings, and therefore corresponding symbol duration is probably different. Besides, different uplink resources probably occupy different quantities of symbols. Therefore, the terminal device receives uplink resources corresponding to different transmission duration.

Third implementation: The time unit is transmission duration corresponding to downlink control signaling for scheduling the uplink resource of the terminal device. Different downlink control signaling probably uses different subcarrier spacings, and therefore corresponding symbol duration is probably different. Besides, different downlink control signaling probably occupies different quantities of symbols during transmission. Therefore, the terminal device receives downlink control signaling corresponding to different transmission duration.

Fourth implementation: The time unit is default/predefined duration including symbol duration corresponding to a subcarrier spacing in the available/mappable transmission parameter set of the first logical channel. For example, the time unit may be duration of a slot including the symbol duration corresponding to the subcarrier spacing.

Fifth implementation: The time unit is duration determined based on symbol duration corresponding to a subcarrier spacing in the available/mappable transmission parameter set of the first logical channel and a default quantity of symbols occupied during data transmission of the logical channel.

Sixth implementation: The time unit is symbol duration corresponding to a subcarrier spacing in the available/mappable transmission parameter set of the first logical channel.

Seventh implementation: The time unit is default/predefined duration including symbol duration corresponding to a subcarrier spacing that is used by a physical resource configured in an SR configuration mapped to/associated with the first logical channel, where the physical resource is used to transmit the SR.

Eighth implementation: The time unit is duration determined based on symbol duration corresponding to a subcarrier spacing that is used by a physical resource configured in an SR configuration mapped to/associated with the first logical channel and a quantity of occupied symbols, where the physical resource is used to transmit the SR.

Ninth implementation: The time unit is symbol duration corresponding to a subcarrier spacing that is used by a physical resource configured in an SR configuration mapped to/associated with the first logical channel, where the physical resource is used to transmit the SR.

Optionally, in an implementation, the regular BSR associated with the first logical channel may be:
 a BSR triggered by arrival of new data on the first logical channel.

Specifically, when data arrives on a logical channel currently configured for the terminal device, a regular BSR can be triggered according to a BSR triggering condition. The logical channel is the first logical channel. Reference may be made to FIG. 2 or FIG. 4.

Optionally, the first logical channel belongs to a logical channel group.

Optionally, in another implementation, the regular BSR associated with the first logical channel may be:
 a BSR triggered by BSR retransmission timer expiry; and the first logical channel is a logical channel with a highest priority among all current second logical channels of the terminal device, where the second logical channel is a logical channel having data available for transmission or a logical channel having data available for transmission and belonging to a logical channel group.

Optionally, in another implementation, the regular BSR associated with the first logical channel may be:
 a BSR triggered by BSR retransmission timer expiry; and the first logical channel is a logical channel for which a value of either of the following two parameters in an associated transmission parameter set is smallest among all current second logical channels of the terminal device:
 parameter 1: transmission duration of the uplink resource; and
 parameter 2: interval between a moment at which control signaling for scheduling the uplink resource is transmitted and a moment at which data is transmitted by using the scheduled uplink resource.

The second logical channel is a logical channel having data available for transmission or a logical channel having data available for transmission and belonging to a logical channel group.

It should be noted that a function and a principle of a BSR retransmission timer may be the same as those of a BSR retransmission timer in an existing communications system.

This embodiment provides a scheduling request processing method, including: determining, by a terminal device, whether there is a regular BSR associated with a first logical channel that is triggered and has not been canceled; and if a regular BSR associated with the first logical channel is triggered and has not been canceled, and the terminal device has no uplink resource available to transmit data of the first logical channel, and a first timer of the terminal device is not running, triggering, by the terminal device, an SR. According to the scheduling request processing method provided in this embodiment, after the BSR is triggered and before the BSR is canceled, if the terminal device has no uplink resource available to transmit the data of the logical channel associated with the BSR, and the first timer of the terminal device is not running, the terminal device may trigger the SR to more quickly request an uplink resource to transmit the data of the logical channel, thereby satisfying a QoS requirement of the data carried on the logical channel and improving uplink scheduling performance.

Embodiment 2

This embodiment is applied to an SR transmission scenario in an uplink scheduling process. Based on Embodiment 1 shown in FIG. 3, this embodiment relates to how to transmit an SR after the SR has been triggered.

Figure 5:
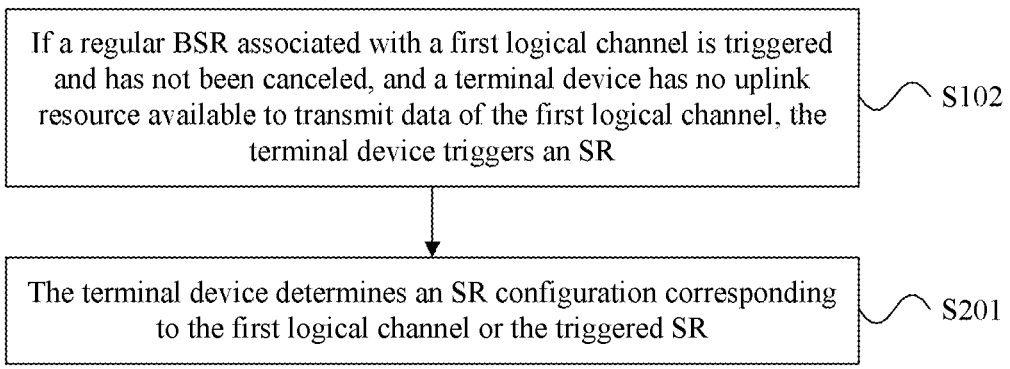
FIG. 5 is a flowchart of a scheduling request processing method according to Embodiment 2 of this application.

FIG. 5 is a flowchart of a scheduling request processing method according to Embodiment 2 of this application. As shown in FIG. 5, the scheduling request processing method provided in this embodiment may further include the following step after S102:

S201: The terminal device determines an SR configuration corresponding to the first logical channel or the triggered SR.

The SR configuration may include at least one of the following parameters: an identifier of the SR configuration, an SR prohibit timer, a maximum quantity of SR transmissions, and a parameter used to determine a location of a physical resource to be used to transmit the SR.

For the concept of the SR configuration, there may be the following cases:

(1) The SR configuration includes the identifier of the SR configuration, the SR prohibit timer, and the maximum quantity of SR transmissions, and also includes the parameter used to determine the location of the physical resource to be used to transmit the SR. In this case, a logical channel is associated with/mapped to at least one SR configuration.

(2) The SR configuration includes the identifier of the SR configuration, the SR prohibit timer, and the maximum quantity of SR transmissions, but does not include the parameter used to determine the location of the physical resource to be used to transmit the SR. The parameter used to determine the location of the physical resource to be used to transmit the SR is included in another SR-related configuration. For example, the SR-related configuration may become an SR resource configuration. In this case, a logical channel is associated with/mapped to at least one SR configuration, and an SR configuration is further associated with/mapped to at least one SR resource configuration.

The SR configuration in the following description may be understood as the SR configuration corresponding to case 1, or may be understood as the SR resource configuration corresponding to case 2.

Specifically, after an SR associated with the first logical channel is triggered, the SR may be considered as pending (pending). The terminal device determines that an SR configuration used to transmit the SR is an SR configuration associated with the first logical channel. For example, referring to FIG. 4, the terminal device triggers the SR 2 associated with the LCH 2, and the terminal device may determine that an SR configuration corresponding to the LCH 2 or the SR 2 is a second SR configuration.

The identifier of the SR configuration is used to uniquely differentiate between different SR configurations. When the SR prohibit timer is running, the SR cannot be transmitted. The maximum quantity of SR transmissions indicates a maximum quantity of times for which the SR can be sent. The parameter used to determine the location of the physical resource to be used to transmit the SR includes a related parameter capable of determining the location of the physical resource to be used to transmit the SR. The physical resource is a time domain resource and a frequency resource. In another aspect, the physical resource may include a PUCCH.

Optionally, in an implementation, the scheduling request processing method provided in this embodiment may further include:

for each first time unit, if the terminal device has, in the first time unit, no uplink resource available to transmit the data of the first logical channel and the terminal device has, in an overlapping time period between the first time unit and a second time unit, the physical resource that is to be used to transmit the SR and that is corresponding to the SR configuration, and the SR prohibit timer is not running, sending, by the terminal device, the SR on the physical resource.

Specifically, when three conditions are satisfied at the same time, the terminal device may transmit the SR associated with the first logical channel. The three conditions are: (1) For each first time unit, the terminal device has, in the first time unit, no uplink resource available to transmit the data of the first logical channel; (2) for each first time unit, the terminal device has, in the overlapping time period between the first time unit and the second time unit, the physical resource that is to be used to transmit the SR and that is corresponding to the SR configuration; and (3) the SR prohibit timer is not running. For example, referring to FIG. 4, at the moment T1, the terminal device has the uplink grant corresponding to the transmission parameter set whose value is the first value set, but the uplink grant is unavailable for the LCH 2. The first condition is satisfied. The terminal device has, in the overlapping time period between the first time unit and the second time unit, a physical resource that is to be used to transmit the SR 2 and that is corresponding to the second SR configuration, namely, a physical resource indicated by  in FIG. 4. The second condition is satisfied. It is assumed that the SR prohibit timer is not running. The third condition is satisfied. Therefore, the terminal device may send the SR 2 on the physical resource.

The "first time unit" is for a "pending regular BSR", and is used to indicate all or a part of a time period of a process from a moment at which the regular BSR is triggered to a moment at which the regular BSR is canceled. The "second time unit" is for the "SR". That there is an overlapping time period between the first time unit and the second time unit may include: (1) The first time unit and the second time unit are a same time unit; (2) the first time unit and the second time unit are two time units, and duration indicated by the first time unit is the same as duration indicated by the second time unit, which may also be understood as: the first time unit and the second time unit completely overlap; (3) the first time unit and the second time unit are two time units, and duration indicated by the first time unit is greater than duration indicated by the second time unit, or duration indicated by the second time unit is greater than duration indicated by the first time unit, which may also be understood as: for the first time unit and the second time unit, duration indicated by one time unit completely covers duration indicated by the other time unit; and (4) the first time unit and the second time unit are two time units, and duration indicated by the first time unit partially overlaps duration indicated by the second time unit, or duration indicated by the second time unit partially overlaps duration indicated by the first time unit, which may also be understood as: for the first time unit and the second time unit, duration indicated by one time unit partially covers duration indicated by the other time unit.

Optionally, in this implementation, when the terminal device determines whether the SR associated with the first logical channel can be transmitted, in addition to the foregoing three conditions, a fourth condition is further included: the first time unit and/or the second time unit are/is not a part of a measurement gap (Measurement Gap).

It should be noted that there may be a plurality of implementations for the second time unit. A technical principle of the implementations of the second time unit is similar to that of the first time unit in Embodiment 1 shown in FIG. 3, and details are not repeated herein.

Optionally, in another implementation, the scheduling request processing method provided in this embodiment may further include:

for each first time unit, if the terminal device has, in the first time unit, no uplink resource available to transmit the data of the first logical channel and the terminal device has, in the first time unit, the physical resource that is to be used to transmit the SR and that is corresponding to the SR configuration, and the SR prohibit timer is not running, sending, by the terminal device, the SR on the physical resource.

Specifically, when three conditions are satisfied at the same time, the terminal device may transmit the SR associated with the first logical channel. The three conditions are: (1) For each first time unit, the terminal device has, in the first time unit, no uplink resource available to transmit the data of the first logical channel; (2) the terminal device has, in the first time unit, the physical resource that is to be used to transmit the SR and that is corresponding to the SR configuration; and (3) the SR prohibit timer is not running. In this implementation, there is only the first time unit.

Optionally, in this implementation, when the terminal device determines whether the SR associated with the first logical channel can be transmitted, in addition to the foregoing three conditions, a fourth condition is further included: the first time unit and/or the second time unit are/is not a part of a measurement gap (Measurement Gap).

Optionally, in another implementation, the scheduling request processing method provided in this embodiment may further include:

for each second time unit, if the terminal device has, in an overlapping time period between a first time unit and the second time unit, no uplink resource available to transmit the data of the first logical channel and the terminal device has, in the second time unit, the physical resource that is to be used to transmit the SR and that is corresponding to the SR configuration, and the SR prohibit timer is not running, sending, by the terminal device, the SR on the physical resource.

Meanings of the first time unit and the second time unit are the same as those in the foregoing description.

Optionally, in this implementation, when the terminal device determines whether the SR associated with the first logical channel can be transmitted, in addition to the foregoing three conditions, a fourth condition may be further included: the first time unit and/or the second time unit are/is not a part of a measurement gap (Measurement Gap).

Optionally, that the terminal device has, in the first time unit, no uplink resource available to transmit the data of the first logical channel may include:

the terminal device does not have any available uplink resource in the first time unit; or the terminal device has an available uplink resource in the first time unit, but a value of a parameter in a transmission parameter set of the uplink resource available for the terminal device in the first time unit is different from a value of a parameter in a transmission parameter set available for the first logical channel.

A technical principle thereof is similar to that in the embodiment shown in FIG. 3, and details are not repeated herein.

Optionally, if the terminal device has the available uplink resource in the first time unit, but the value of the parameter in the transmission parameter set of the uplink resource available for the terminal device in the first time unit is different from the value of the parameter in the transmission parameter set available for the first logical channel, in an implementation, the method may further include:

if the terminal device is configured to support parallel transmission on a first physical channel and a second physical channel, transmitting, by the terminal device, the data on the uplink resource available in the first time unit.

Specifically, the first physical channel and the second physical channel are two different physical channels that are respectively used to transmit data and uplink control information. For example, the first physical channel may be a PUSCH, and the second physical channel may be a PUCCH. The terminal device is configured to support parallel transmission on the first physical channel and the second physical channel. To be specific, the terminal device can transmit upper layer data on the first physical channel, and can also transmit the uplink control information on the second physical channel. In this case, the terminal device sends, on the physical resource, the SR associated with the first logical channel, and the terminal device sends the data on the uplink resource. For example, referring to FIG. 4, the terminal device may transmit the SR 2 on an SR resource of the LCH 2, and may transmit the BSR 2 and data of the LCH 1 on an uplink resource of the LCH 1.

The "data" herein includes various user plane data and control plane data above a physical layer and control signaling generated by a MAC layer, an RLC layer, a PDCP layer, and an SDAP layer.

That the terminal device is configured to support parallel transmission on a first physical channel and a second physical channel can improve data transmission efficiency and resource utilization.

Optionally, if the terminal device has the available uplink resource in the first time unit, but the value of the parameter in the transmission parameter set of the uplink resource available for the terminal device in the first time unit is different from the value of the parameter in the transmission parameter set available for the first logical channel, in another implementation, the method may further include:

skipping, by the terminal device, transmitting the data on the uplink resource available in the first time unit, and only sending the SR on the physical resource.

Specifically, because the terminal device does not support parallel transmission on a first physical channel and a second physical channel, only the SR is sent on the physical resource, to ensure timely scheduling of the uplink resource so as to satisfy a QoS requirement of the data of the first logical channel.

Optionally, in an implementation, the skipping, by the terminal device, transmitting the data on the uplink resource available in the first time unit, and only sending the SR on the physical resource may include:

instructing, by a MAC layer of the terminal device, a PHY layer of the terminal device to send the SR to a network device on the available physical resource, and skipping, by the MAC layer, instructing the PHY layer to send the data to the network device on an available PUSCH resource.

Optionally, in another implementation, the skipping, by the terminal device, transmitting the data on the uplink resource available in the first time unit, and only sending the SR on the physical resource may include:

instructing, by a MAC layer of the terminal device, a PHY layer of the terminal device to send the SR to a network device on the available physical resource, and to send the data to the network device on an available PUSCH resource, where the data herein may be understood as a transport block (Transport Block).

The PHY layer of the terminal device sends the SR to the network device on the available physical resource, and does not send the data to the network device on the available PUSCH resource. The PHY layer directly discards data received from the MAC layer.

Optionally, in still another implementation, the skipping, by the terminal device, transmitting the data on the uplink resource available in the first time unit, and only sending the SR on the physical resource may include:

instructing, by a MAC layer of the terminal device, a PHY layer of the terminal device to send the data to a network device on an available PUSCH resource.

The PHY layer of the terminal device sends the data to the network device on the available PUSCH resource.

In a process of transmitting the data by the PHY layer, the PHY layer receives a notification or an instruction that is sent by the MAC layer to instruct to transmit the SR. In this case, the PHY layer of the terminal device sends the SR to the network device on the available physical resource, and the PHY layer may take the following two measures for the data that is being transmitted through the PUSCH:

Measure 1: The physical layer directly abandons transmission of the data.

Measure 2: The physical layer performs puncturing processing on the data being transmitted. Specifically, the puncturing (Puncture) processing is performed on the data being transmitted, in a time period that overlaps a time period during which the SR is transmitted.

This embodiment provides a scheduling request processing method. After an SR associated with a first logical channel has been triggered, a terminal device determines an SR configuration corresponding to the first logical channel or the SR. According to the scheduling request processing method provided in this embodiment, timely transmission of the SR can be ensured after the SR is triggered, and therefore the terminal device can more quickly request an uplink resource by using the SR, to transmit data of the logical channel, thereby satisfying a QoS requirement of the data carried on the logical channel and improving uplink scheduling performance.

Embodiment 3

This embodiment is applied to an SR cancellation scenario in an uplink scheduling process. Based on Embodiment 1 or Embodiment 2, this embodiment relates to how to cancel an SR after the SR has been triggered.

Figure 6:
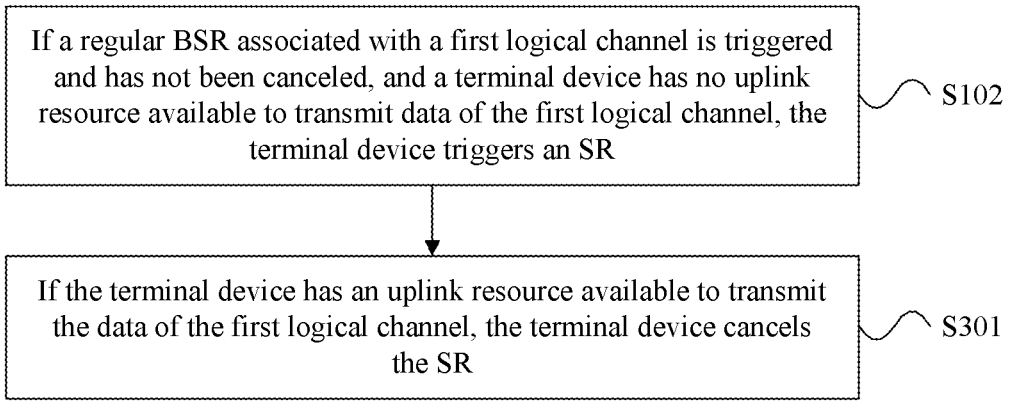
FIG. 6 is a flowchart of a scheduling request processing method according to Embodiment 3 of this application.

FIG. 6 is a flowchart of a scheduling request processing method according to Embodiment 3 of this application. As shown in FIG. 6, the scheduling request processing method provided in this embodiment may further include the following step after S102:

S301: If the terminal device has an uplink resource available to transmit the data of the first logical channel, the terminal device cancels the SR.

Specifically, after the terminal device triggers the SR associated with the first logical channel, the terminal device can cancel the SR provided that the terminal device has the uplink resource available to transmit the data of the first logical channel. Therefore, resources are saved, power consumption of the terminal device is reduced, and a waste of resources caused by repeated scheduling and incorrect scheduling of a network device is avoided.

Optionally, in an implementation, that the terminal device has an uplink resource available to transmit the data of the first logical channel may include:

the terminal device has an available uplink resource and a value of a parameter in a transmission parameter set of the uplink resource available for the terminal device is the same as a value of a parameter in a transmission parameter set available for the first logical channel, and a data unit transmitted by using the uplink resource available for the terminal device includes a buffer status report and the buffer status report includes at least a buffer size of a logical channel group to which the first logical channel belongs.

Optionally, in another implementation, that the terminal device has an uplink resource available to transmit the data of the first logical channel includes:

the terminal device has an available uplink resource and a value of a parameter in a transmission parameter set of the uplink resource available for the terminal device is the same as a value of a parameter in a transmission parameter set available for the first logical channel, and the uplink resource available for the terminal device is capable of accommodating all data, available for transmission, of the first logical channel.

Optionally, in still another implementation, that the terminal device has an uplink resource available to transmit the data of the first logical channel includes:

the terminal device has an available uplink resource and a value of a parameter in a transmission parameter set of the uplink resource available for the terminal device is the same as a value of a parameter in a transmission parameter set available for the first logical channel, and the uplink resource available for the terminal device is capable of accommodating all data, available for transmission, of the first logical channel and all data, available for transmission, of another logical channel, where the another logical channel and the first logical channel are mapped to a same SR configuration.

The transmission parameter set may include a plurality of parameters. Transmission parameter sets are the same only when values of all parameters in the sets are the same.

This embodiment provides a scheduling request processing method. After an SR associated with a first logical channel has been triggered, a terminal device cancels the SR provided that the terminal device has an uplink resource available to transmit data of the first logical channel. This saves resources, avoids a waste of resources, and reduces power consumption of the terminal device.

Embodiment 4

This embodiment is applied to an SR transmission scenario in an uplink scheduling process and relates to how to perform SR transmission after an SR has been triggered, so as to satisfy a QoS requirement of data of a logical channel.

Figure 7:
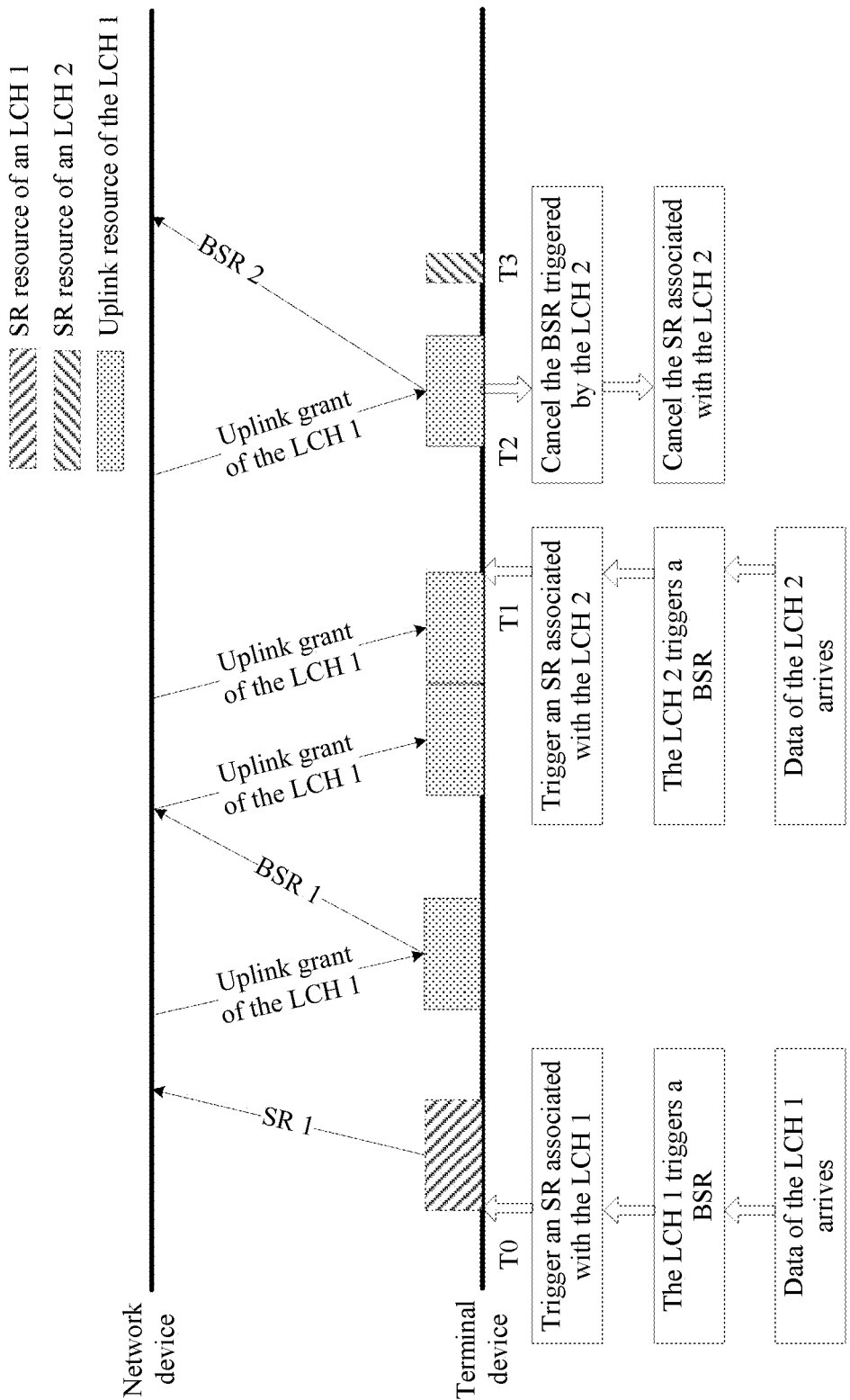
FIG. 7 is a schematic diagram of a scenario in which an SR cannot be transmitted.

FIG. 7 is a schematic diagram of a scenario in which an SR cannot be transmitted. For a configuration of a logical channel, refer to FIG. 2.

As shown in FIG. 7, an uplink scheduling process is as follows:

At a moment T0, arrival of data on an LCH 1 triggers a regular BSR, marked as BSR 1. Because a terminal device has no available uplink resource, the BSR 1 may trigger an SR associated with the LCH 1, marked as SR 1. The terminal device reports a buffer size (buffer size) of an LCG including the LCH 1 to a network device. Afterwards, the network device starts to schedule, to the terminal device, an uplink resource/uplink grant corresponding to a transmission parameter set whose value is a first value set.

At a moment T1, arrival of data on an LCH 2 triggers a regular BSR, marked as BSR 2. At the moment T1, the network device does not schedule any uplink grant to the terminal device. Therefore, the terminal device triggers an SR associated with the LCH 2, marked as SR 2. A next moment at which a physical resource that can be used to send the SR 2 and that is corresponding to an SR configuration mapped to/associated with the LCH 2 appears earliest is a moment T3. However, during a time period from a moment T2 to a moment at which the network device receives the BSR 2 and sends an uplink grant corresponding to a transmission parameter set whose value is a second value set, because the terminal device always has the uplink grant that is scheduled by the network device and that is corresponding to the transmission parameter set whose value is the first value set, namely, an uplink grant scheduled for transmission of the data of the LCH 1, the terminal device cannot send the SR 2 triggered by the arrival of the data on the LCH 2. In this case, although the terminal device reports the BSR 2, transmitting the BSR 2 by using the uplink grant corresponding to the transmission parameter set whose value is the first value set to request an uplink resource cannot satisfy a delay requirement of the LCH 2, and the terminal device cannot send the SR 2 associated with the LCH 2 to more quickly request the uplink resource. Consequently, a delay requirement of uplink data transmission of the LCH 2 cannot be satisfied. In another aspect, transmitting the BSR 2 by using the uplink grant corresponding to the transmission parameter set whose value is the first value set to request the uplink resource for the LCH 2 probably also cannot satisfy a requirement of the LCH 2 on reliability of control signaling for requesting the uplink resource.

This embodiment provides a scheduling request processing method, to resolve a technical problem that a delay requirement of data carried on a logical channel and/or a reliability requirement of control signaling for requesting a resource cannot be satisfied because an SR cannot be transmitted after the SR is triggered.

Figure 8:
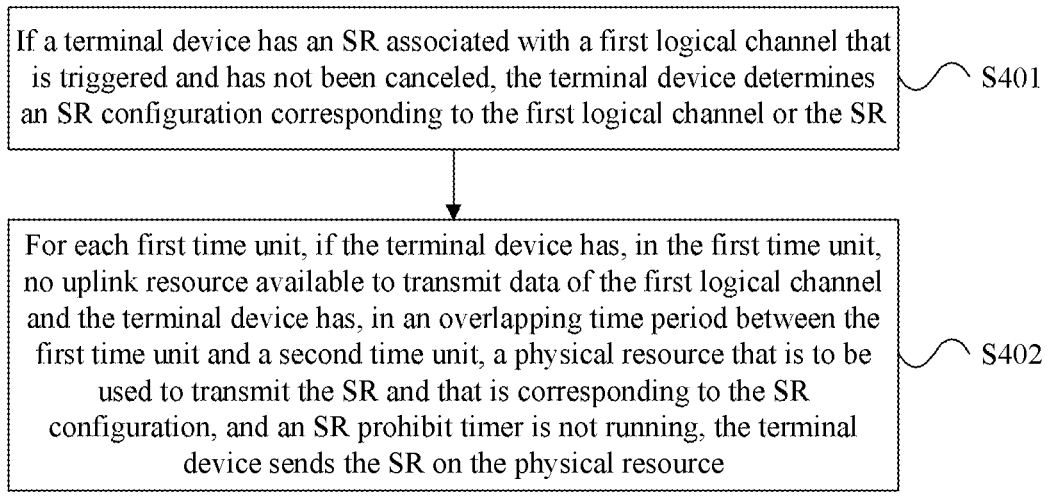
FIG. 8 is a flowchart of a scheduling request processing method according to Embodiment 4 of this application.

FIG. 8 is a flowchart of a scheduling request processing method according to Embodiment 4 of this application. The scheduling request processing method provided in this embodiment is performed by a terminal device. As shown in FIG. 8, the scheduling request processing method provided in this embodiment may include the following steps.

S401: If the terminal device has an SR associated with a first logical channel that is triggered and has not been canceled, the terminal device determines an SR configuration corresponding to the first logical channel or the SR.

The SR configuration includes at least one of the following parameters: an identifier of the SR configuration, an SR prohibit timer, a maximum quantity of SR transmissions, and a parameter used to determine a location of a physical resource to be used to transmit the SR.

For the concept of the SR configuration, there may be the following cases:

(1) The SR configuration includes the identifier of the SR configuration, the SR prohibit timer, and the maximum quantity of SR transmissions, and also includes the parameter used to determine the location of the physical resource to be used to transmit the SR. In this case, a logical channel is associated with/mapped to at least one SR configuration.

(2) The SR configuration includes the identifier of the SR configuration, the SR prohibit timer, and the maximum quantity of SR transmissions, but does not include the parameter used to determine the location of the physical resource to be used to transmit the SR. The parameter used to determine the location of the physical resource to be used to transmit the SR is included in another SR-related configuration. For example, the SR-related configuration may become an SR resource configuration. In this case, a logical channel is associated with/mapped to at least one SR configuration, and an SR configuration is further associated with/mapped to at least one SR resource configuration.

The SR configuration in the following description may be understood as the SR configuration corresponding to case 1, or may be understood as the SR resource configuration corresponding to case 2.

Specifically, after the SR associated with the first logical channel is triggered, the SR may be considered as pending (pending). The first logical channel is a logical channel associated with the triggered SR. If the terminal device has the SR associated with the first logical channel that is triggered and has not been canceled, the terminal device determines the SR configuration corresponding to the first logical channel or the SR. For example, in the scenario shown in FIG. 7, the terminal device triggers the SR 2 associated with the LCH 2, and the terminal device may determine that an SR configuration corresponding to the LCH 2 or the SR 2 is a second SR configuration.

The identifier of the SR configuration is used to uniquely differentiate between different SR configurations. When the SR prohibit timer is running, the SR cannot be transmitted. The maximum quantity of SR transmissions indicates a maximum quantity of times for which the SR can be sent. The parameter used to determine the location of the physical resource to be used to transmit the SR includes a related parameter capable of determining the location of the physical resource to be used to transmit the SR. The physical resource is a time domain resource and a frequency resource. In another aspect, the physical resource is a physical resource on a PUCCH.

It should be noted that there are many scenarios in which the SR is triggered. In this embodiment of this application, how the SR is triggered is not limited. For example, reference may be made to the SR triggering conditions in the embodiment shown in FIG. 3, or the SR may be any SR that can be triggered in an existing communications system.

S402: For each first time unit, if the terminal device has, in the first time unit, no uplink resource available to transmit data of the first logical channel and the terminal device has, in an overlapping time period between the first time unit and a second time unit, a physical resource that is to be used to transmit the SR and that is corresponding to the SR configuration, and an SR prohibit timer is not running, the terminal device sends the SR on the physical resource.

Figure 9:
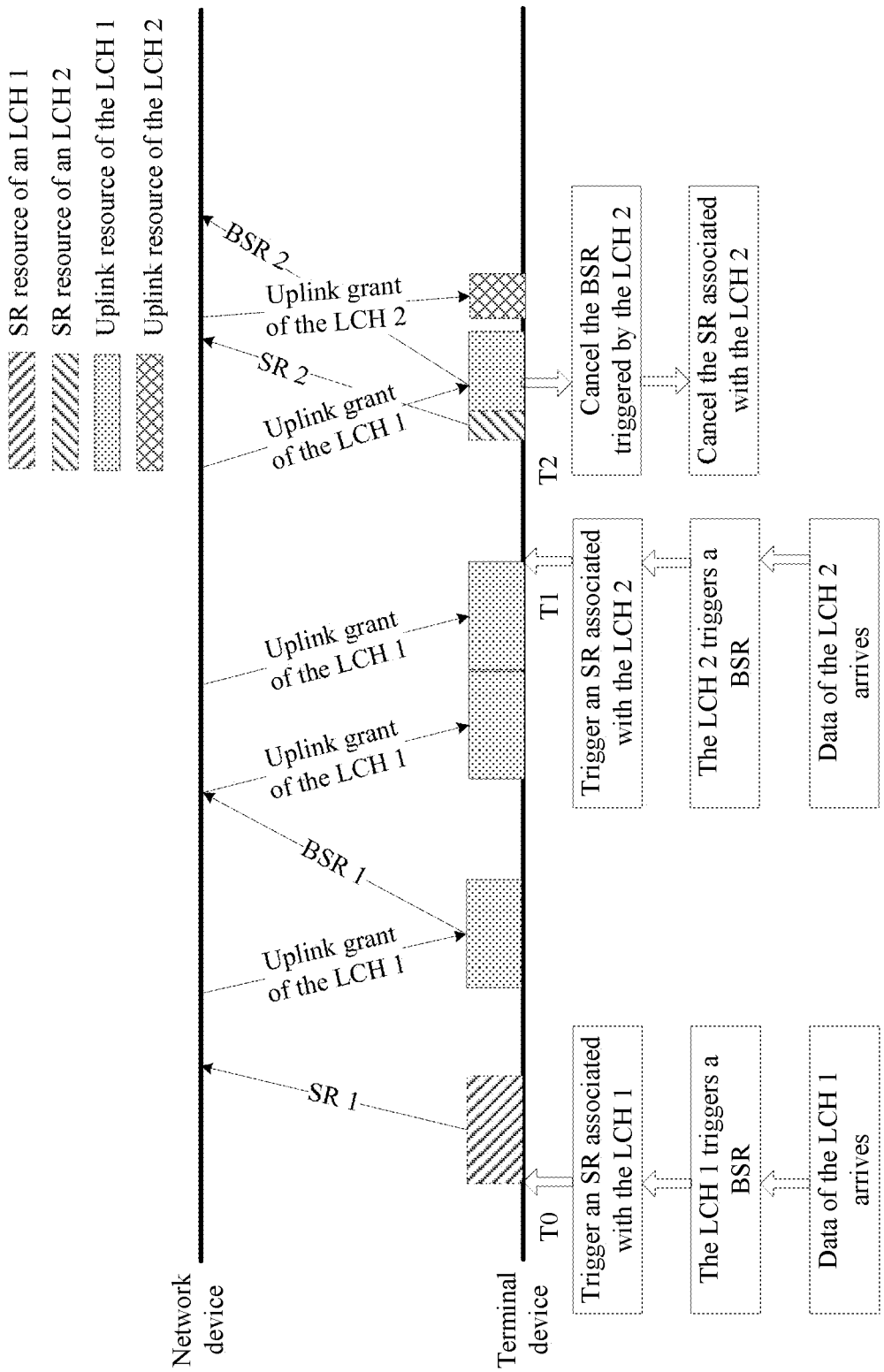
FIG. 9 is a schematic diagram of a scenario in which an SR is transmitted according to Embodiment 4 of this application.

Specifically, when three conditions are satisfied at the same time, the terminal device may transmit the SR associated with the first logical channel. The three conditions are: (1) For each first time unit, the terminal device has, in the first time unit, no uplink resource available to transmit the data of the first logical channel; (2) for each first time unit, the terminal device has, in the overlapping time period between the first time unit and the second time unit, the physical resource that is to be used to transmit the SR and that is corresponding to the SR configuration; and (3) the SR prohibit timer is not running. For a specific SR transmission process, refer to FIG. 9. FIG. 9 is a schematic diagram of a scenario in which an SR is transmitted according to Embodiment 4 of this application. The terminal device determines that an SR configuration corresponding to the SR 2 is a second SR configuration. The terminal device may send the SR 2 on a physical resource that is to be used to transmit the SR 2 and that is corresponding to the second SR configuration. A delay is much shorter than that in FIG. 7, a delay requirement of uplink data transmission of the LCH 2 is satisfied, and a requirement of the LCH 2 on reliability of control signaling for requesting the uplink resource is satisfied.

That there is an overlapping time period between the first time unit and the second time unit may include: (1) The first time unit and the second time unit are a same time unit; (2) the first time unit and the second time unit are two time units, and duration indicated by the first time unit is the same as duration indicated by the second time unit, which may also be understood as: the first time unit and the second time unit completely overlap; (3) the first time unit and the second time unit are two time units, and duration indicated by the first time unit is greater than duration indicated by the second time unit, or duration indicated by the second time unit is greater than duration indicated by the first time unit, which may also be understood as: for the first time unit and the second time unit, duration indicated by one time unit completely covers duration indicated by the other time unit; and (4) the first time unit and the second time unit are two time units, and duration indicated by the first time unit partially overlaps duration indicated by the second time unit, or duration indicated by the second time unit partially overlaps duration indicated by the first time unit, which may also be understood as: for the first time unit and the second time unit, duration indicated by one time unit partially covers duration indicated by the other time unit.

Optionally, if the first time unit and the second time unit are a same time unit, S402 may be described as:

for each first time unit, if the terminal device has, in the first time unit, no uplink resource available to transmit the data of the first logical channel and the terminal device has, in the first time unit, the physical resource that is to be used to transmit the SR and that is corresponding to the SR configuration, and the SR prohibit timer is not running, sending, by the terminal device, the SR on the physical resource.

Optionally, in this implementation, when the terminal device determines whether the SR associated with the first logical channel can be transmitted, in addition to the foregoing three conditions, a fourth condition may be further included: the first time unit and/or the second time unit are/is not a part of a measurement gap (Measurement Gap).

Optionally, in another implementation, the scheduling request processing method provided in this embodiment may further include:

for each second time unit, if the terminal device has, in an overlapping time period between a first time unit and the second time unit, no uplink resource available to transmit the data of the first logical channel and the terminal device has, in the second time unit, the physical resource that is to be used to transmit the SR and that is corresponding to the SR configuration, and the SR prohibit timer is not running, sending, by the terminal device, the SR on the physical resource.

Optionally, in this implementation, when the terminal device determines whether the SR associated with the first logical channel can be transmitted, in addition to the foregoing three conditions, a fourth condition may be further included: the first time unit and/or the second time unit are/is not a part of a measurement gap (Measurement Gap).

Apparently, according to the scheduling request processing method provided in this embodiment, when the terminal device has the SR associated with the first logical channel that is triggered and has not been canceled, the terminal device may determine the SR configuration corresponding to the first logical channel or the SR, and send the SR on the physical resource when the conditions are satisfied. Therefore, the uplink resource is more quickly requested by using the SR, to transmit the data of the first logical channel, thereby satisfying a QoS requirement of the data carried on the first logical channel and improving uplink scheduling performance.

It should be noted that there may be a plurality of implementations for the first time unit and the second time unit. The following describes in detail the first time unit and the second time unit by using specific examples. Certainly, the time unit in this embodiment may include but is not limited to the following implementations.

First implementation: The time unit is default/predefined duration. For example, the duration may be duration of a slot (Slot) including symbol duration corresponding to a reference subcarrier spacing. The reference subcarrier spacing may be, for example, a subcarrier spacing of 15 kHz.

Second implementation: The time unit is transmission duration corresponding to the uplink resource received by the terminal device. Different uplink resources probably use different subcarrier spacings, and therefore corresponding symbol duration is probably different. Besides, different uplink resources probably occupy different quantities of symbols. Therefore, the terminal device receives uplink resources corresponding to different transmission duration.

Third implementation: The time unit is transmission duration corresponding to downlink control signaling for scheduling the uplink resource of the terminal device. Different downlink control signaling probably uses different subcarrier spacings, and therefore corresponding symbol duration is probably different. Besides, different downlink control signaling probably occupies different quantities of symbols during transmission. Therefore, the terminal device receives downlink control signaling corresponding to different transmission duration.

Fourth implementation: The time unit is default/predefined duration including symbol duration corresponding to a subcarrier spacing in an available/mappable transmission parameter set of the first logical channel. For example, the time unit may be duration of a slot including the symbol duration corresponding to the subcarrier spacing.

Fifth implementation: The time unit is duration determined based on symbol duration corresponding to a subcarrier spacing in an available/mappable transmission parameter set of the first logical channel and a default quantity of symbols occupied during data transmission of the logical channel.

Sixth implementation: The time unit is symbol duration corresponding to a subcarrier spacing in the available/mappable transmission parameter set of the first logical channel.

Seventh implementation: The time unit is default/predefined duration including symbol duration corresponding to a subcarrier spacing that is used by the physical resource configured in the SR configuration mapped to/associated with the first logical channel, where the physical resource is used to transmit the SR.

Eighth implementation: The time unit is duration determined based on symbol duration corresponding to a subcarrier spacing that is used by the physical resource configured in the SR configuration mapped to/associated with the first logical channel and a quantity of occupied symbols, where the physical resource is used to transmit the SR.

Ninth implementation: The time unit is symbol duration corresponding to a subcarrier spacing that is used by the physical resource configured in the SR configuration mapped to/associated with the first logical channel, where the physical resource is used to transmit the SR.

Optionally, that the terminal device has, in the first time unit, no uplink resource available to transmit the data of the first logical channel may include:

the terminal device does not have any available uplink resource in the first time unit; or the terminal device has an available uplink resource in the first time unit, but a value of a parameter in a transmission parameter set of the uplink resource available for the terminal device in the first time unit is different from a value of a parameter in a transmission parameter set available for the first logical channel.

Specifically, the terminal device does not have any available uplink resource in the first time unit, or the terminal device has an available uplink resource in the first time unit. The "uplink resource" herein is for the "terminal device", and may include a first-type uplink resource and a second-type uplink resource. It can be understood that the "uplink resource available for the terminal device" is different from the "uplink resource available to transmit the data of the first logical channel". When the value of the parameter in the transmission parameter set of the uplink resource available for the terminal device in the first time unit is different from the value of the parameter in the transmission parameter set available for the first logical channel, the uplink resource is available for the "terminal device", but is unavailable for the "first logical channel". In another aspect, the "uplink resource" herein may include an UL-SCH and a PUSCH.

The first-type uplink resource is an uplink resource configured by the network device for the terminal device by using radio resource control layer signaling, or an uplink resource that is configured by the network device for the terminal device by using radio resource control layer signaling and that is activated by using physical layer signaling or Media Access Control layer signaling. The second-type uplink resource may include an uplink grant scheduled by the network device.

The transmission parameter set may include a plurality of parameters. Transmission parameter sets are different provided that one parameter in the sets has different values.

Optionally, if the terminal device has the available uplink resource in the first time unit, but the value of the parameter in the transmission parameter set of the uplink resource available for the terminal device in the first time unit is different from the value of the parameter in the transmission parameter set available for the first logical channel, in an implementation, the method may further include:
if the terminal device is configured to support parallel transmission on a first physical channel and a second physical channel, transmitting, by the terminal device, the data on the uplink resource available in the first time unit.

Specifically, the first physical channel and the second physical channel are two different physical channels that are respectively used to transmit data and uplink control information. For example, the first physical channel may be a PUSCH, and the second physical channel may be a PUCCH. The terminal device is configured to support parallel transmission on the first physical channel and the second physical channel. To be specific, the terminal device can transmit upper layer data on the first physical channel, and can also transmit the uplink control information on the second physical channel. In this case, the terminal device sends, on the physical resource, the SR associated with the first logical channel, and the terminal device sends the data on the uplink resource. For example, referring to FIG. 4, the terminal device may transmit the SR 2 on an SR resource of the LCH 2, and may transmit the BSR 2 and data of the LCH 1 on an uplink resource of the LCH 1.

The "data" herein includes various user plane data and control plane data above a physical layer and control signaling generated by a MAC layer, an RLC layer, a PDCP layer, and an SDAP layer.

That the terminal device is configured to support parallel transmission on a first physical channel and a second physical channel can improve data transmission efficiency and resource utilization.

Optionally, if the terminal device has the available uplink resource in the first time unit, but the value of the parameter in the transmission parameter set of the uplink resource available for the terminal device in the first time unit is different from the value of the parameter in the transmission parameter set available for the first logical channel, in another implementation, the method may further include:
skipping, by the terminal device, transmitting the data on the uplink resource available in the first time unit, and only sending the SR on the physical resource.

Specifically, because the terminal device does not support parallel transmission on a first physical channel and a second physical channel, only the SR is sent on the physical resource, to ensure timely scheduling of the uplink resource so as to satisfy a QoS requirement of the data of the first logical channel.

Optionally, in an implementation, the skipping, by the terminal device, transmitting the data on the uplink resource available in the first time unit, and only sending the SR on the physical resource may include:
instructing, by a MAC layer of the terminal device, a PHY layer of the terminal device to send the SR to the network device on the available physical resource, and skipping, by the MAC layer, instructing the PHY layer to send the data to the network device on an available PUSCH resource.

Optionally, in another implementation, the skipping, by the terminal device, transmitting the data on the uplink resource available in the first time unit, and only sending the SR on the physical resource may include:
instructing, by a MAC layer of the terminal device, a PHY layer of the terminal device to send the SR to the network device on the available physical resource, and to send the data to the network device on an available PUSCH resource, where the data herein may be understood as a transport block (Transport Block).

The PHY layer of the terminal device sends the SR to the network device on the available physical resource, and does not send the data to the network device on the available PUSCH resource. The PHY layer directly discards data received from the MAC layer.

Optionally, in still another implementation, the skipping, by the terminal device, transmitting the data on the uplink resource available in the first time unit, and only sending the SR on the physical resource may include:
instructing, by a MAC layer of the terminal device, a PHY layer of the terminal device to send the data to the network device on an available PUSCH resource.

The PHY layer of the terminal device sends the data to the network device on the available PUSCH resource.

In a process of transmitting the data by the PHY layer, the PHY layer receives a notification or an instruction that is sent by the MAC layer to instruct to transmit the SR. In this case, the PHY layer of the terminal device sends the SR to the network device on the available physical resource, and the PHY layer may take the following two measures for data that is being transmitted through the PUSCH:
Measure 1: The physical layer directly abandons transmission of the data.
Measure 2: The physical layer performs puncturing processing on the data being transmitted. Specifically, the puncturing (Puncture) processing is performed on the data being transmitted, in a time period that overlaps a time period during which the SR is transmitted.

Optionally, in an implementation, the SR associated with the first logical channel is:
an SR triggered by a regular BSR that is triggered by arrival of new data on the first logical channel.

Specifically, when data arrives on a logical channel currently configured for the terminal device, if a regular BSR can be triggered according to a BSR triggering condition, the regular BSR may trigger an SR associated with the logical channel. The logical channel is the first logical channel.

Optionally, the first logical channel belongs to a logical channel group.

Optionally, in another implementation, the SR associated with the first logical channel is:
- an SR triggered by a regular BSR that is triggered by BSR retransmission timer expiry; and the first logical channel is a logical channel with a highest priority among all current second logical channels of the terminal device, where the second logical channel is a logical channel having data available for transmission or a logical channel having data available for transmission and belonging to a logical channel group.

Optionally, in another implementation, the regular BSR associated with the first logical channel may be:
- a BSR triggered by BSR retransmission timer expiry; and the first logical channel is a logical channel for which a value of either of the following two parameters in an associated transmission parameter set is smallest among all current second logical channels of the terminal device:
- parameter 1: transmission duration of the uplink resource; and
- parameter 2: interval between a moment at which control signaling for scheduling the uplink resource is transmitted and a moment at which data is transmitted by using the scheduled uplink resource.

The second logical channel is a logical channel having data available for transmission or a logical channel having data available for transmission and belonging to a logical channel group.

For a related technical principle and technical effect of the scheduling request processing method provided in this embodiment, refer to Embodiment 2. Details are not repeated herein.

This embodiment provides a scheduling request processing method. After an SR associated with a first logical channel has been triggered, a terminal device determines an SR configuration corresponding to the first logical channel or the SR. According to the scheduling request processing method provided in this embodiment, timely transmission of the SR can be ensured after the SR is triggered, and therefore the terminal device can more quickly request an uplink resource by using the SR, to transmit the data of the logical channel, thereby satisfying a QoS requirement of the data carried on the logical channel and improving uplink scheduling performance.

Embodiment 5

This embodiment is applied to an SR cancellation scenario in an uplink scheduling process. Based on Embodiment 4, this embodiment relates to how to cancel an SR after the SR has been triggered.

A scheduling request processing method provided in this embodiment may further include:
- if a terminal device has an uplink resource available to transmit data of a first logical channel, canceling, by the terminal device, an SR.

Specifically, after the terminal device triggers the SR associated with the first logical channel, the terminal device can cancel the SR provided that the terminal device has the uplink resource available to transmit the data of the first logical channel. Therefore, resources are saved, power consumption of the terminal device is reduced, and a waste of resources caused by repeated scheduling and incorrect scheduling of a network device is avoided.

Optionally, in an implementation, that a terminal device has an uplink resource available to transmit data of a first logical channel may include:
- the terminal device has an available uplink resource and a value of a parameter in a transmission parameter set of the uplink resource available for the terminal device is the same as a value of a parameter in a transmission parameter set available for the first logical channel, and a data unit transmitted by using the uplink resource available for the terminal device includes a buffer status report and the buffer status report includes at least a buffer size of a logical channel group to which the first logical channel belongs.

Optionally, in another implementation, that a terminal device has an uplink resource available to transmit data of a first logical channel includes:
- the terminal device has an available uplink resource and a value of a parameter in a transmission parameter set of the uplink resource available for the terminal device is the same as a value of a parameter in a transmission parameter set available for the first logical channel, and the uplink resource available for the terminal device is capable of accommodating all data, available for transmission, of the first logical channel.

Optionally, in still another implementation, that a terminal device has an uplink resource available to transmit data of a first logical channel includes:
- the terminal device has an available uplink resource and a value of a parameter in a transmission parameter set of the uplink resource available for the terminal device is the same as a value of a parameter in a transmission parameter set available for the first logical channel, and the uplink resource available for the terminal device is capable of accommodating all data, available for transmission, of the first logical channel and all data, available for transmission, of another logical channel, where the another logical channel and the first logical channel are mapped to a same SR configuration.

The transmission parameter set may include a plurality of parameters. Transmission parameter sets are the same only when values of all parameters in the sets are the same.

For a related technical principle and technical effect of the scheduling request processing method provided in this embodiment, refer to Embodiment 3. Details are not repeated herein.

This embodiment provides a scheduling request processing method. After an SR associated with a first logical channel has been triggered, a terminal device cancels the SR provided that the terminal device has an uplink resource available to transmit data of the first logical channel. This saves resources, avoids a waste of resources, and reduces power consumption of the terminal device.

Embodiment 6

This embodiment is applied to an SR cancellation scenario in an uplink scheduling process, and relates to how to cancel an SR after the SR has been triggered.

Figure 10:
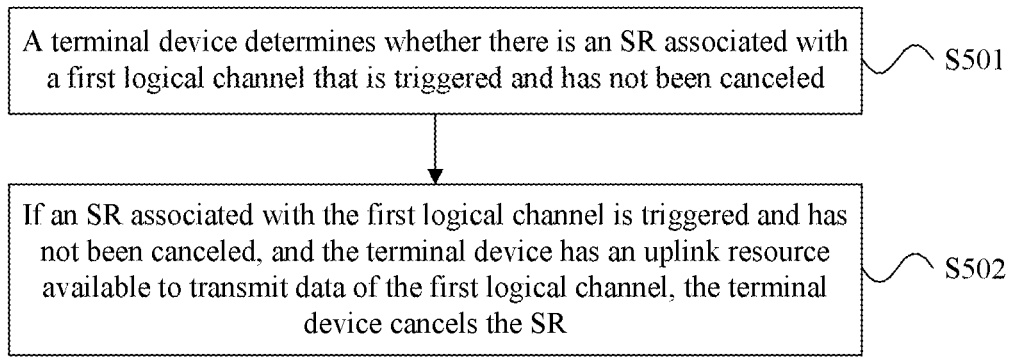
FIG. 10 is a flowchart of a scheduling request processing method according to Embodiment 6 of this application.

FIG. 10 is a flowchart of a scheduling request processing method according to Embodiment 6 of this application. The scheduling request processing method provided in this embodiment is performed by a terminal device. As shown in FIG. 10, the scheduling request processing method provided in this embodiment may include the following steps.

S501: The terminal device determines whether there is an SR associated with a first logical channel that is triggered and has not been canceled.

If the terminal device determines that there is an SR associated with the first logical channel that is triggered and has not been canceled, S502 is performed.

S502: If an SR associated with the first logical channel is triggered and has not been canceled, and the terminal device has an uplink resource available to transmit data of the first logical channel, the terminal device cancels the SR.

Specifically, after the SR associated with the first logical channel is triggered, the terminal device can cancel the SR provided that the terminal device has the uplink resource available to transmit the data of the first logical channel. Therefore, resources are saved, power consumption of the terminal device is reduced, and a waste of resources caused by repeated scheduling and incorrect scheduling of a network device is avoided.

Optionally, in an implementation, that the terminal device has an uplink resource available to transmit data of the first logical channel may include:

the terminal device has an available uplink resource and a value of a parameter in a transmission parameter set of the uplink resource available for the terminal device is the same as a value of a parameter in a transmission parameter set available for the first logical channel, and a data unit transmitted by using the uplink resource available for the terminal device includes a buffer status report and the buffer status report includes at least a buffer size of a logical channel group to which the first logical channel belongs.

Specifically, the terminal device has the available uplink resource. The "uplink resource" herein is for the "terminal device", and may include a first-type uplink resource and a second-type uplink resource. It can be understood that the "uplink resource available for the terminal device" is different from the "uplink resource available to transmit the data of the first logical channel". When the value of the parameter in the transmission parameter set of the uplink resource available for the terminal device is different from the value of the parameter in the transmission parameter set available for the first logical channel, the uplink resource is available for the "terminal device", but is unavailable for the "first logical channel". In another aspect, the "uplink resource" herein may include an UL-SCH and a PUSCH.

The first-type uplink resource is an uplink resource configured by the network device for the terminal device by using radio resource control layer signaling, or an uplink resource that is configured by the network device for the terminal device by using radio resource control layer signaling and that is activated by using physical layer signaling or Media Access Control layer signaling. The second-type uplink resource may include an uplink grant scheduled by the network device.

The transmission parameter set may include a plurality of parameters. Transmission parameter sets are the same only when values of all parameters in the sets are the same.

Optionally, in another implementation, that the terminal device has an uplink resource available to transmit data of the first logical channel includes:

the terminal device has an available uplink resource and a value of a parameter in a transmission parameter set of the uplink resource available for the terminal device is the same as a value of a parameter in a transmission parameter set available for the first logical channel, and the uplink resource available for the terminal device is capable of accommodating all data, available for transmission, of the first logical channel.

Optionally, in still another implementation, that the terminal device has an uplink resource available to transmit data of the first logical channel includes:

the terminal device has an available uplink resource and a value of a parameter in a transmission parameter set of the uplink resource available for the terminal device is the same as a value of a parameter in a transmission parameter set available for the first logical channel, and the uplink resource available for the terminal device is capable of accommodating all data, available for transmission, of the first logical channel and all data, available for transmission, of another logical channel, where the another logical channel and the first logical channel are mapped to a same SR configuration.

Optionally, in an implementation, the SR associated with the first logical channel is: an SR triggered by a regular BSR that is triggered by arrival of new data on the first logical channel.

Specifically, when data arrives on a logical channel currently configured for the terminal device, if a regular BSR can be triggered according to a BSR triggering condition, the regular BSR may trigger an SR associated with the logical channel. The logical channel is the first logical channel.

Optionally, the first logical channel belongs to a logical channel group.

Optionally, in another implementation, the SR associated with the first logical channel is:

an SR triggered by a regular BSR that is triggered by BSR retransmission timer expiry; and the first logical channel is a logical channel with a highest priority among all current second logical channels of the terminal device, where the second logical channel is a logical channel having data available for transmission or a logical channel having data available for transmission and belonging to a logical channel group.

Optionally, in another implementation, the regular BSR associated with the first logical channel may be:

a BSR triggered by BSR retransmission timer expiry; and the first logical channel is a logical channel for which a value of either of the following two parameters in an associated transmission parameter set is smallest among all current second logical channels of the terminal device:

parameter 1: transmission duration of the uplink resource; and parameter 2: interval between a moment at which control signaling for scheduling the uplink resource is transmitted and a moment at which data is transmitted by using the scheduled uplink resource.

The second logical channel is a logical channel having data available for transmission or a logical channel having data available for transmission and belonging to a logical channel group.

For a related technical principle and technical effect of the scheduling request processing method provided in this embodiment, refer to Embodiment 3 and Embodiment 5. Details are not repeated herein.

This embodiment provides a scheduling request processing method. After an SR associated with a first logical channel has been triggered, a terminal device cancels the SR provided that the terminal device has an uplink resource available to transmit data of the first logical channel. This saves resources, avoids a waste of resources, and reduces power consumption of the terminal device.

Embodiment 7

This embodiment is applied to a BSR retransmission scenario in an uplink scheduling process.

Figure 11:
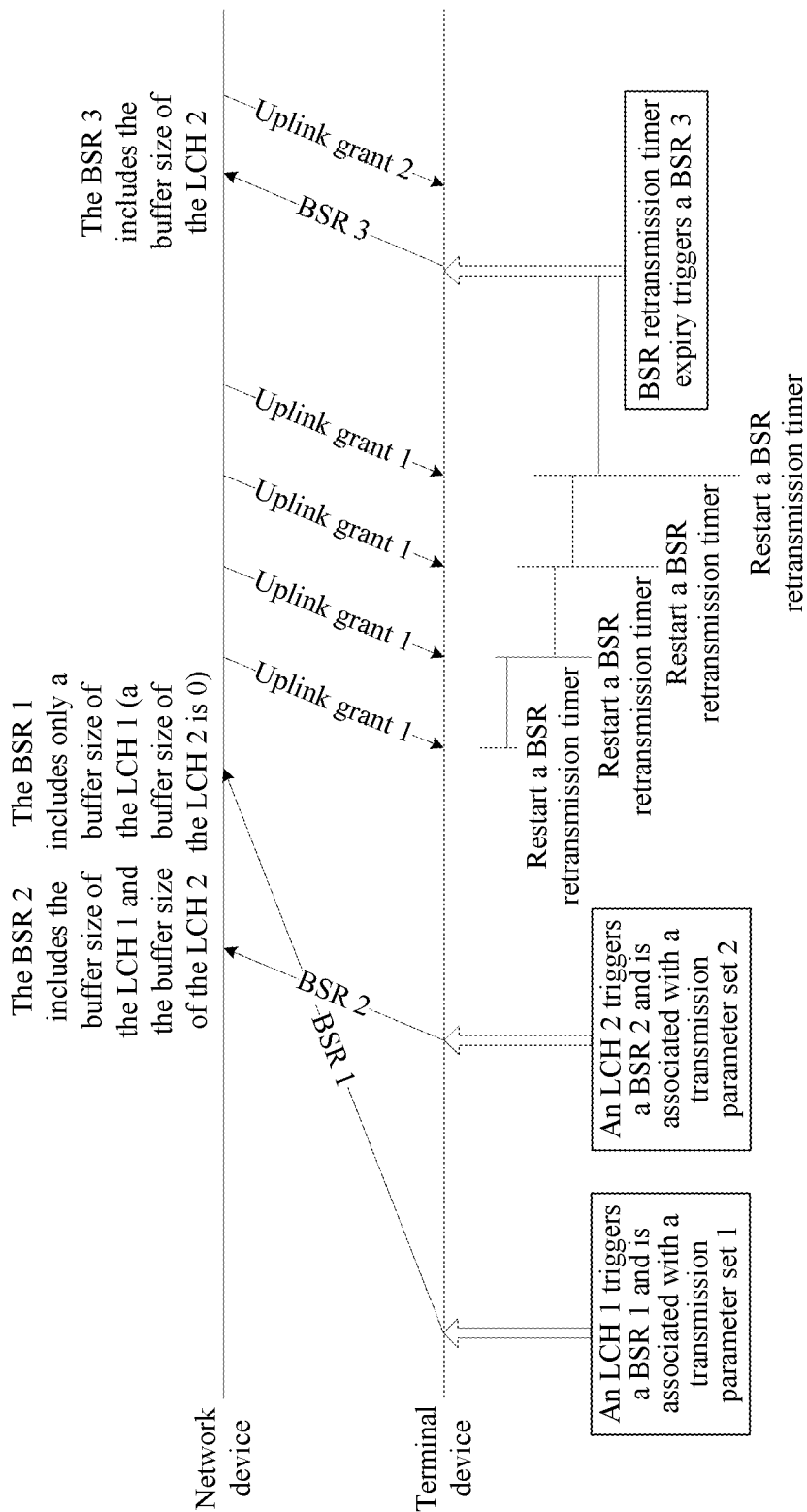
FIG. 11 is a schematic diagram of a scenario of BSR retransmission.
Figure 12:
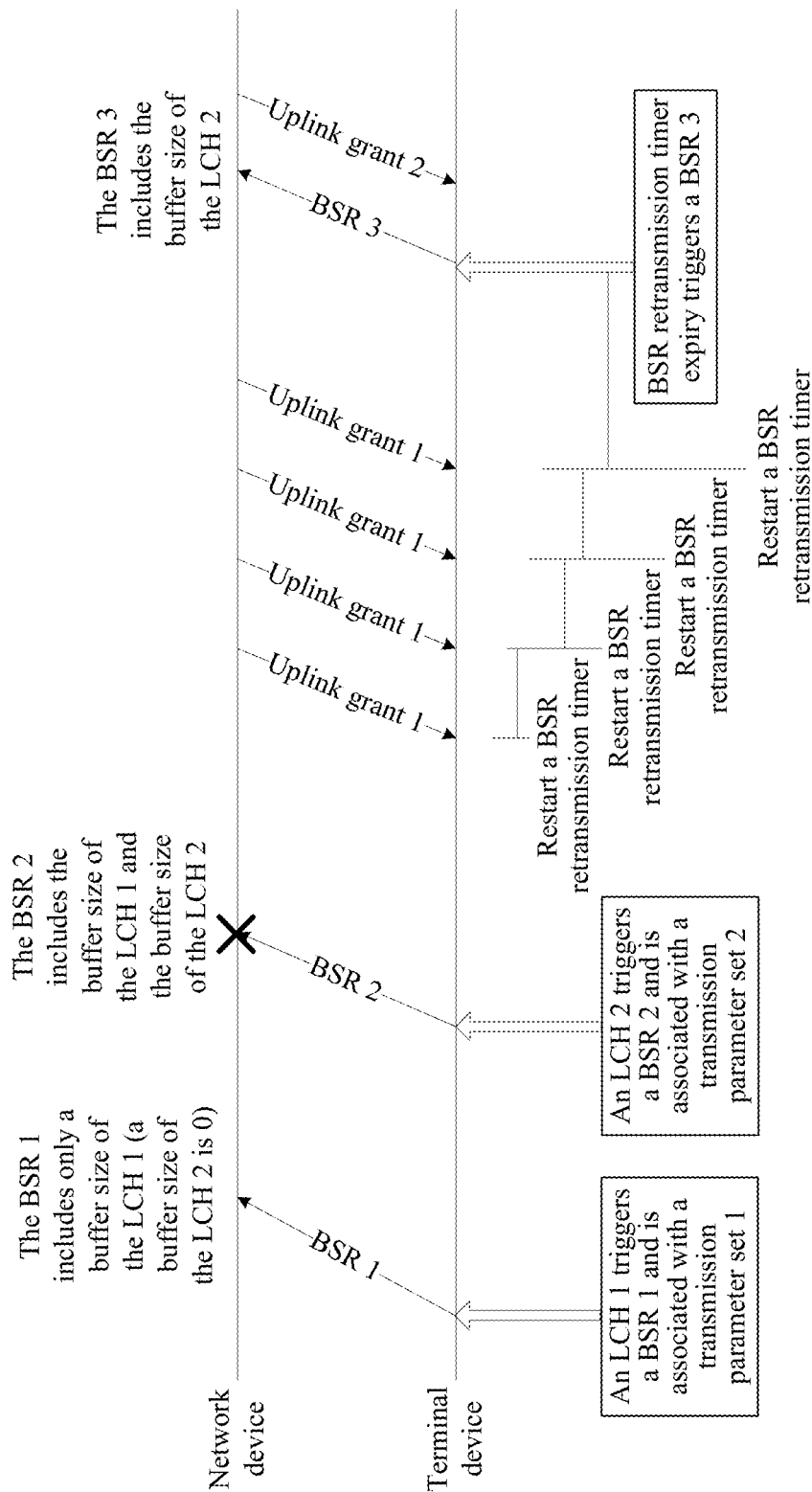
FIG. 12 is a schematic diagram of another scenario of BSR retransmission.

FIG. 11 is a schematic diagram of a scenario of BSR retransmission. FIG. 12 is a schematic diagram of another scenario of BSR retransmission.

As shown in FIG. 11 and FIG. 12, data is transmitted on a logical channel of a terminal device, so that a BSR is triggered and sent, and further a BSR retransmission timer is started. If the terminal device receives an uplink resource/uplink grant when the BSR retransmission timer is running, the terminal device restarts the BSR retransmission timer. However, when a value of a transmission parameter set corresponding to the uplink resource/uplink grant is not a value of an available/mappable transmission parameter set of an LCH that triggers the BSR, because the BSR retransmission timer is restarted by using the wrong uplink resource/uplink grant, a running time of the BSR retransmission timer is prolonged. Therefore, if the BSR is lost, a time at which the BSR is retriggered is delayed, and consequently scheduling for the data of the logical channel that triggers the BSR is delayed.

This embodiment provides a scheduling request processing method, to resolve the foregoing technical problem that scheduling for the data of the logical channel that triggers the BSR is delayed because the time at which the BSR is retriggered is delayed.

In the scheduling request processing method provided in this embodiment, a scenario in which a BSR is triggered is as follows.

Scenario 1 in which the BSR is triggered: The scenario is based on a case in which a regular BSR is triggered by arrival of data on a logical channel.

At a moment, data arrives on the first logical channel that belongs to an LCG and that is currently configured for a terminal device, and a regular BSR is triggered.

In this scenario, the logical channel on which the BSR is triggered by the arrival of the data is the first logical channel.

Scenario 2 in which the BSR is triggered: The scenario is based on a case in which a regular BSR is triggered by BSR retransmission timer expiry.

At a moment, the terminal device triggers a BSR. The BSR may be a periodic BSR (Periodic BSR), a padding BSR (Padding BSR), or a regular BSR (Regular BSR) that is triggered by BSR retransmission timer expiry.

In this scenario, the first logical channel is a logical channel with a highest priority among all current second logical channels of the terminal device. The second logical channel is a logical channel having data available for transmission or a logical channel having data available for transmission and belonging to a logical channel group.

Scenario 3 in which the BSR is triggered:

A BSR is triggered by BSR retransmission timer expiry; and the first logical channel is a logical channel for which a value of either of the following two parameters in an associated transmission parameter set is smallest among all the current second logical channels of the terminal device:

parameter 1: transmission duration of an uplink resource; and parameter 2: interval between a moment at which control signaling for scheduling an uplink resource is transmitted and a moment at which data is transmitted by using the scheduled uplink resource.

In this scenario, the first logical channel is a logical channel with a highest priority among all the current second logical channels of the terminal device. The second logical channel is a logical channel having data available for transmission or a logical channel having data available for transmission and belonging to a logical channel group.

The scheduling request processing method provided in this embodiment may include:

determining, by the terminal device, whether there is a BSR that is triggered and has not been canceled; if the terminal device determines that there is a BSR that is triggered and has not been canceled, if the terminal device has an uplink resource for new data transmission in a time unit, generating, by the terminal device, a BSR MAC CE, and transmitting the BSR MAC CE by using the uplink resource; and starting or restarting, by the terminal device, a BSR retransmission timer, where a value/duration of the started or restarted BSR retransmission timer is determined based on a configuration scheme for a BSR retransmission timer value or BSR retransmission timer duration.

In the time unit, when the terminal device receives the uplink resource/uplink grant, if a value of a parameter in a transmission parameter set of the uplink resource is the same as a value of a parameter in an available/mappable transmission parameter set of the first logical channel, the terminal device restarts the BSR retransmission timer. The value/duration of the restarted BSR retransmission timer is determined based on the configuration scheme for the BSR retransmission timer value/duration. If the value of the parameter in the transmission parameter set of the uplink resource is different from the value of the parameter in the available/mappable transmission parameter set of the first logical channel, the terminal device does not restart the BSR retransmission timer.

The parameter in the available/mappable transmission parameter of the logical channel may include but is not limited to at least one of the following: a subcarrier spacing, a cyclic prefix length, uplink resource transmission duration, an interval between a moment at which control signaling for scheduling the uplink resource is transmitted and a moment at which data is transmitted by using the uplink resource, and a serving cell of the terminal device corresponding to the uplink resource.

The time unit may be but is not limited to any of the following cases:

(1) The time unit is default/predefined duration. For example, the duration may be duration of a slot (Slot) including symbol duration corresponding to a reference subcarrier spacing. The reference subcarrier spacing may be, for example, a subcarrier spacing of 15 kHz.

(2) The time unit is transmission duration corresponding to the uplink resource received by the terminal device. Different uplink resources probably use different subcarrier spacings, and therefore corresponding symbol duration is probably different. Besides, different uplink resources probably occupy different quantities of symbols. Therefore, the terminal device receives uplink resources corresponding to different transmission duration.

(3) The time unit is transmission duration corresponding to downlink control signaling for scheduling the uplink resource of the terminal device. Different downlink control signaling probably uses different subcarrier spacings, and therefore corresponding symbol duration is probably different. Besides, different downlink control signaling probably occupies different quantities of symbols during transmission. Therefore, the terminal device receives downlink control signaling corresponding to different transmission duration.

(4) The time unit is default/predefined duration including symbol duration corresponding to a subcarrier spacing in an available/mappable transmission parameter set of the first logical channel. For example, the time unit may be duration of a slot including the symbol duration corresponding to the subcarrier spacing.

(5) The time unit is duration determined based on symbol duration corresponding to a subcarrier spacing in an available/mappable transmission parameter set of the first logical channel and a default quantity of symbols occupied during data transmission of the logical channel.

(6) The time unit is symbol duration corresponding to a subcarrier spacing in the available/mappable transmission parameter set of the first logical channel.

The value of the BSR retransmission timer is configured by a network device for the terminal device by using dedicated signaling. There may be the following optional schemes for configuring the value of the BSR retransmission timer:

Scheme 1: The network device configures only one BSR retransmission timer value for the terminal device. Corresponding to this scheme, regardless of which logical channel has data arrived and triggers the BSR, the duration of the BSR retransmission timer started or restarted by the terminal device is set to the value configured by the network device.

Scheme 2: The network device configures a BSR retransmission timer value for each logical channel group of the terminal device. Corresponding to this scheme, when a logical channel belonging to a logical channel group has data arrived and triggers a BSR, the duration value of the BSR retransmission timer started or restarted by the terminal device is set to a BSR retransmission timer value of the logical channel group configured by the network device.

Scheme 3: The network device configures a BSR retransmission timer value for each logical channel of the terminal device. Corresponding to this scheme, when a logical channel belonging to a logical channel group has data arrived and triggers a BSR, the duration value of the BSR retransmission timer started or restarted by the terminal device is set to a BSR retransmission timer value of the logical channel configured by the network device.

Scheme 4: The network device configures an associated BSR retransmission timer value for one or more SR configurations mapped to/corresponding to each logical channel or each logical channel group of the terminal device. Corresponding to this scheme, when a logical channel belonging to a logical channel group has data arrived and triggers a BSR, the duration value of the BSR retransmission timer started or restarted by the terminal device is set to an associated BSR retransmission timer value of the one or more SR configurations mapped to/corresponding to the logical channel configured by the network device. The SR configuration mapped to/associated with the logical channel may include but is not limited to at least one of the following parameters: an identifier of the SR configuration, an SR prohibit timer, a maximum quantity of SR transmissions, and a parameter used to determine a location of a physical resource to be used to transmit the SR.

For the concept of the SR configuration, there may be the following cases:

(1) The SR configuration includes the identifier of the SR configuration, the SR prohibit timer, and the maximum quantity of SR transmissions, and also includes the parameter used to determine the location of the physical resource to be used to transmit the SR. In this case, a logical channel is associated with/mapped to at least one SR configuration.

(2) The SR configuration includes the identifier of the SR configuration, the SR prohibit timer, and the maximum quantity of SR transmissions, but does not include the parameter used to determine the location of the physical resource to be used to transmit the SR. The parameter used to determine the location of the physical resource to be used to transmit the SR is included in another SR-related configuration. For example, the SR-related configuration may become an SR resource configuration. In this case, a logical channel is associated with/mapped to at least one SR configuration, and an SR configuration is further associated with/mapped to at least one SR resource configuration.

The SR configuration in the following description may be understood as the SR configuration corresponding to case 1, or may be understood as the SR resource configuration corresponding to case 2.

It should be noted that, corresponding to scheme 2, scheme 3, and scheme 4, the terminal device may maintain/configure only one BSR retransmission timer, or may maintain/configure one BSR retransmission timer separately for each logical channel group in scheme 2, each logical channel in scheme 3, and one or more SR configurations in scheme 4.

According to the scheduling request processing method provided in this embodiment of this application, the following case can be avoided: The terminal device receives an uplink resource for a low priority logical channel, and therefore retransmission of a BSR triggered by a high priority logical channel on which the uplink resource cannot be used to transmit data is delayed. Therefore, the BSR triggered by the high priority logical channel can be retransmitted in a timely manner. In addition, by setting different BSR retransmission duration for logical channels having different QoS requirements, it can also be ensured that the BSR triggered by the high priority logical channel can be retransmitted in a timely manner.

Figure 13:
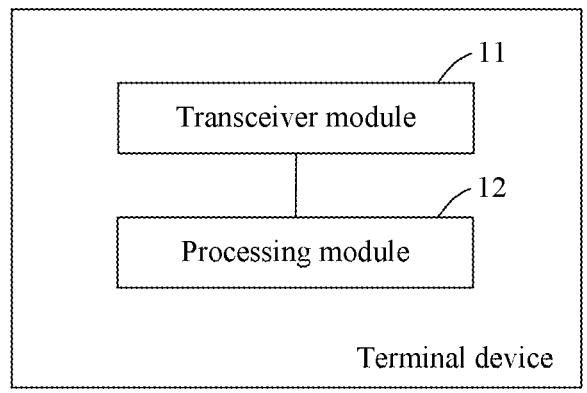
FIG. 13 is a schematic structural diagram of a structure of a terminal device according to an embodiment of this application.

FIG. 13 is a schematic structural diagram of a structure of a terminal device according to an embodiment of this application. The terminal device provided in this embodiment of this application is configured to perform the scheduling request processing method provided in any of method Embodiment 1 to method Embodiment 3. As shown in FIG. 13, the terminal device provided in this embodiment of this application may include a transceiver module 11 and a processing module 12.

The processing module 12 is configured to: determine whether there is a regular buffer status report BSR associated with a first logical channel that is triggered and has not been canceled; and if a regular BSR associated with the first logical channel is triggered and has not been canceled, and the terminal device has no uplink resource available to transmit data of the first logical channel, and a first timer of the terminal device is not running, trigger a scheduling request SR, where the first timer is configured to delay transmission of the SR.

Optionally, the regular BSR associated with the first logical channel is:
a BSR triggered by arrival of new data on the first logical channel.

Optionally, the regular BSR associated with the first logical channel is:
a BSR triggered by BSR retransmission timer expiry; and the first logical channel is a logical channel with a highest priority among all current second logical channels of the terminal device, where the second logical channel is a logical channel having data available for transmission or a logical channel having data available for transmission and belonging to a logical channel group.

Optionally, that the terminal device has no uplink resource available to transmit data of the first logical channel includes:
the terminal device has, in a first time unit, no uplink resource available to transmit the data of the first logical channel, and/or the terminal device does not have a first-type uplink resource available to transmit the data of the first logical channel.

The first-type uplink resource is an uplink resource configured by a network device for the terminal device by using radio resource control layer signaling, or an uplink resource that is configured by the network device for the terminal device by using radio resource control layer signaling and that is activated by using physical layer signaling or Media Access Control layer signaling.

Optionally, that the terminal device has, in a first time unit, no uplink resource available to transmit the data of the first logical channel includes:
the terminal device does not have any available uplink resource in the first time unit; or
the terminal device has an available uplink resource in the first time unit, but a value of a parameter in a transmission parameter set of the uplink resource available for the terminal device in the first time unit is different from a value of a parameter in a transmission parameter set available for the first logical channel.

Optionally, that the terminal device does not have a first-type uplink resource available to transmit the data of the first logical channel includes:
the terminal device does not have any available first-type uplink resource; or
the terminal device has an available first-type uplink resource, but a value of a parameter in a transmission parameter set of the first-type uplink resource available for the terminal device is different from a value of a parameter in a transmission parameter set available for the first logical channel.

Optionally, the processing module 12 is further configured to:
determine an SR configuration corresponding to the first logical channel or the SR.

The SR configuration includes at least one of the following parameters: an identifier of the SR configuration, an SR prohibit timer, a maximum quantity of SR transmissions, and a parameter used to determine a location of a physical resource to be used to transmit the SR.

Optionally, the transceiver module 11 is configured to:
for each first time unit, if the terminal device has, in the first time unit, no uplink resource available to transmit the data of the first logical channel and the terminal device has, in an overlapping time period between the first time unit and a second time unit, the physical resource that is to be used to transmit the SR and that is corresponding to the SR configuration, and the SR prohibit timer is not running, send the SR on the physical resource.

Optionally, the transceiver module 11 is configured to:
for each first time unit, if the terminal device has, in the first time unit, no uplink resource available to transmit the data of the first logical channel and the terminal device has, in the first time unit, the physical resource that is to be used to transmit the SR and that is corresponding to the SR configuration, and the SR prohibit timer is not running, send the SR on the physical resource.

Optionally, that the terminal device has, in a first time unit, no uplink resource available to transmit the data of the first logical channel includes:
the terminal device does not have any available uplink resource in the first time unit; or
the terminal device has an available uplink resource in the first time unit, but a value of a parameter in a transmission parameter set of the uplink resource available for the terminal device in the first time unit is different from a value of a parameter in a transmission parameter set available for the first logical channel.

Optionally, if the terminal device has the available uplink resource in the first time unit, but the value of the parameter in the transmission parameter set of the uplink resource available for the terminal device in the first time unit is different from the value of the parameter in the transmission parameter set available for the first logical channel, the transceiver module 11 is further configured to:
if the terminal device is configured to support parallel transmission on a first physical channel and a second physical channel, transmit the data on the uplink resource available in the first time unit.

Optionally, the processing module 12 is further configured to:
if the terminal device has an uplink resource available to transmit the data of the first logical channel, cancel the SR.

Optionally, that the terminal device has an uplink resource available to transmit the data of the first logical channel includes:
the terminal device has an available uplink resource and a value of a parameter in a transmission parameter set of the uplink resource available for the terminal device is the same as the value of the parameter in the transmission parameter set available for the first logical channel, and a data unit transmitted by using the uplink resource available for the terminal device includes a buffer status report and the buffer status report includes at least a buffer size of a logical channel group to which the first logical channel belongs.

Optionally, that the terminal device has an uplink resource available to transmit the data of the first logical channel includes:
the terminal device has an available uplink resource and a value of a parameter in a transmission parameter set of the uplink resource available for the terminal device is the same as the value of the parameter in the transmission parameter set available for the first logical channel, and the uplink resource available for the terminal device is capable of accommodating all data, available for transmission, of the first logical channel.

Optionally, that the terminal device has an uplink resource available to transmit the data of the first logical channel includes:
the terminal device has an available uplink resource and a value of a parameter in a transmission parameter set of the uplink resource available for the terminal device is the same as the value of the parameter in the transmission parameter set available for the first logical channel, and the uplink resource available for the terminal device is capable of accommodating all data, available for transmission, of the first logical channel and all data, available for transmission, of another logical channel, where the another logical channel and the first logical channel are mapped to the same SR configuration.

The terminal device provided in this embodiment of this application is configured to perform the scheduling request processing method provided in any of method Embodiment 1 to method Embodiment 3. Technical principles and technical effects thereof are similar, and details are not repeated herein.

Another embodiment of this application further provides a terminal device, configured to perform the scheduling request processing method provided in either of method Embodiment 4 and method Embodiment 5. For a structure of the terminal device, refer to FIG. 13. The terminal device provided in this embodiment of this application may include a transceiver module and a processing module.

The processing module is configured to: if the terminal device has a scheduling request SR associated with a first logical channel that is triggered and has not been canceled, determine an SR configuration corresponding to the first logical channel or the SR.

The transceiver module is configured to: for each first time unit, if the terminal device has, in the first time unit, no uplink resource available to transmit data of the first logical channel and the terminal device has, in an overlapping time period between the first time unit and a second time unit, a physical resource that is to be used to transmit the SR and that is corresponding to the SR configuration, and an SR prohibit timer is not running, send the SR on the physical resource.

The SR configuration includes at least one of the following parameters: an identifier of the SR configuration, the SR prohibit timer, a maximum quantity of SR transmissions, and a parameter used to determine a location of the physical resource to be used to transmit the SR.

Optionally, the SR associated with the first logical channel is:
an SR triggered by a regular buffer status report BSR that is triggered by arrival of new data on the first logical channel.

Optionally, the SR associated with the first logical channel is:
an SR triggered by a regular BSR that is triggered by BSR retransmission timer expiry; and the first logical channel is a logical channel with a highest priority among all current second logical channels of the terminal device, where the second logical channel is a logical channel having data available for transmission or a logical channel having data available for transmission and belonging to a logical channel group.

Optionally, that the terminal device has, in the first time unit, no uplink resource available to transmit data of the first logical channel includes:
the terminal device does not have any available uplink resource in the first time unit; or
the terminal device has an available uplink resource in the first time unit, but a value of a parameter in a transmission parameter set of the uplink resource available for the terminal device in the first time unit is different from a value of a parameter in a transmission parameter set available for the first logical channel.

Optionally, if the terminal device has the available uplink resource in the first time unit, but the value of the parameter in the transmission parameter set of the uplink resource available for the terminal device in the first time unit is different from the value of the parameter in the transmission parameter set available for the first logical channel, the transceiver module is further configured to:
if the terminal device is configured to support parallel transmission on a first physical channel and a second physical channel, transmit the data on the uplink resource available in the first time unit.

Optionally, the processing module is further configured to:
if the terminal device has an uplink resource available to transmit the data of the first logical channel, cancel the SR.

Optionally, that the terminal device has an uplink resource available to transmit the data of the first logical channel includes:
the terminal device has an available uplink resource and a value of a parameter in a transmission parameter set of the uplink resource available for the terminal device is the same as the value of the parameter in the transmission parameter set available for the first logical channel, and a data unit transmitted by using the uplink resource available for the terminal device includes a buffer status report and the buffer status report includes at least a buffer size of a logical channel group to which the first logical channel belongs.

Optionally, that the terminal device has an uplink resource available to transmit the data of the first logical channel includes:
the terminal device has an available uplink resource and a value of a parameter in a transmission parameter set of the uplink resource available for the terminal device is the same as the value of the parameter in the transmission parameter set available for the first logical channel, and the uplink resource available for the terminal device is capable of accommodating all data, available for transmission, of the first logical channel.

Optionally, that the terminal device has an uplink resource available to transmit the data of the first logical channel includes:
the terminal device has an available uplink resource and a value of a parameter in a transmission parameter set of the uplink resource available for the terminal device is the same as the value of the parameter in the transmission parameter set available for the first logical channel, and the uplink resource available for the terminal device is capable of accommodating all data, available for transmission, of the first logical channel and all data, available for transmission, of another logical channel, where the another logical channel and the first logical channel are mapped to the same SR configuration.

The terminal device provided in this embodiment of this application is configured to perform the scheduling request processing method provided in either of method Embodiment 4 and method Embodiment 5. Technical principles and technical effects thereof are similar, and details are not repeated herein.

Still another embodiment of this application further provides a terminal device, configured to perform the scheduling request processing method provided in method Embodiment 6. For a structure of the terminal device, refer to FIG. 13. The terminal device provided in this embodiment of this application may include a transceiver module and a processing module.

The processing module is configured to: determine whether there is a scheduling request SR associated with a first logical channel that is triggered and has not been canceled; and
if an SR associated with the first logical channel is triggered and has not been canceled, and the terminal device has an uplink resource available to transmit data of the first logical channel, cancel the SR.

The terminal device provided in this embodiment of this application is configured to perform the scheduling request processing method provided in method Embodiment 6. Technical principles and technical effects thereof are similar, and details are not repeated herein.

Still another embodiment of this application further provides a terminal device, configured to perform the scheduling request processing method provided in method Embodiment 7. For a structure of the terminal device, refer to FIG. 13. The terminal device provided in this embodiment of this application may include a transceiver module and a processing module.

The terminal device provided in this embodiment of this application is configured to perform the scheduling request processing method provided in method Embodiment 7. Technical principles and technical effects thereof are similar, and details are not repeated herein.

Figure 14:
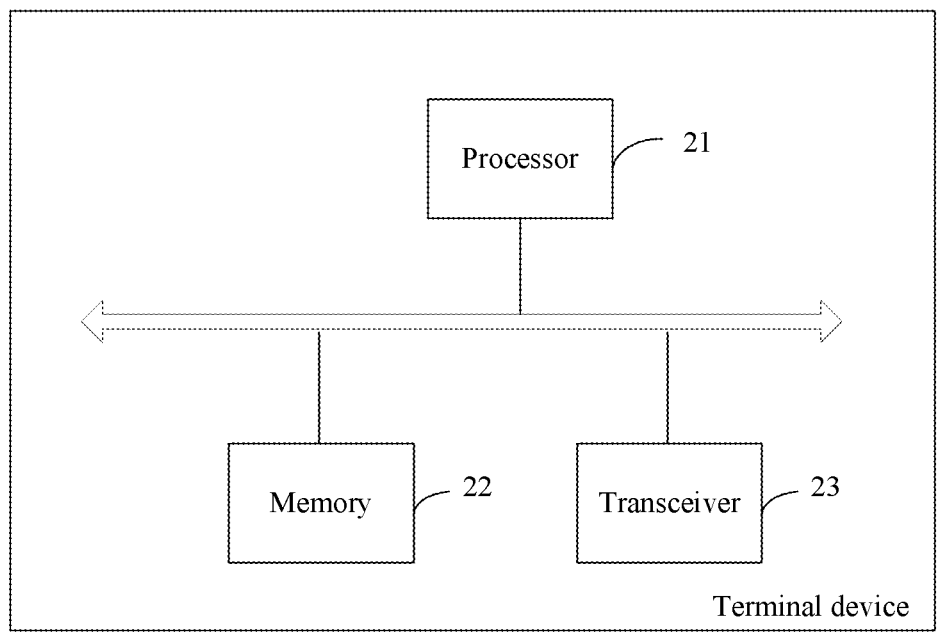
FIG. 14 is a schematic structural diagram of another structure of a terminal device according to an embodiment of this application.

FIG. 14 is a schematic structural diagram of another structure of a terminal device according to an embodiment of this application. As shown in FIG. 14, the terminal device may include a processor 21, a memory 22, and a transceiver 23. The memory 22 is configured to store an instruction. The transceiver 23 is configured to communicate with other devices. The processor 21 is configured to execute the instruction stored in the memory 22, so that the terminal device performs the scheduling request processing method provided in any of method Embodiment 1 to method Embodiment 7. Specific implementations and technical effects thereof are similar, and details are not repeated herein It may be understood that, the processor used by the network device or the terminal device in this application may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor can implement or execute various example logical blocks, modules, and circuits that are described with reference to the content disclosed in this application. The processor may alternatively be a combination that implements a computing function, for example, a combination of one or more microprocessors or a combination of a DSP and a microprocessor.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions in the embodiments of this application rather than limiting this application. Although the embodiments of this application are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions in the embodiments of this application.

What is claimed is:

1. A scheduling request processing method, implemented by a terminal device, comprising:
determining that:
a regular buffer status report (BSR) associated with a first logical channel is triggered and has not been canceled,
there is an available uplink resource,
a first value of at least one parameter in a transmission parameter set of the available uplink resource is different from a second value of a corresponding parameter in a transmission parameter set available for the first logical channel, and
a first timer of a terminal device is not running; and
triggering a scheduling request (SR) in response to the determining that the regular BSR is triggered and has not been canceled, there is the available uplink resource, the first value is different from the second value and the first timer is not running;
wherein the corresponding parameter in the transmission parameter set available for the first logical channel comprises a serving cell of the terminal device corresponding to an uplink resource.

2. The method according to claim 1, wherein the regular BSR associated with the first logical channel is:
a BSR triggered by arrival of new data on the first logical channel; or
a BSR triggered by BSR retransmission timer expiry; and the first logical channel is a logical channel with a highest priority among all current logical channels of the terminal device having data available for transmission, or having data available for transmission and belonging to a logical channel group.

3. The method according to claim 1, wherein
determining that there is the available uplink resource, and the first value of at least one parameter in the transmission parameter set of the available uplink resource is different from the second value of the corresponding parameter in a transmission parameter set available for the first logical channel comprises:
determining that there is an available uplink resource in a first time unit, and in the first time unit a first value of at least one parameter in a transmission parameter set of the available uplink resource is different from a second value of a corresponding parameter in a transmission parameter set available for the first logical channel.

4. The method according to claim 3, wherein in response to the determining that the terminal device has the available uplink resource in the first time unit, and the first value in the first time unit is different from the second value, the method further comprises:
transmitting the data on the available uplink resource available in the first time unit in response to the terminal device being configured to support parallel transmission on a first physical channel and a second physical channel.

5. The method according to claim 1, wherein determining that there is the available uplink resource, and the first value of at least one parameter in the transmission parameter set of the available uplink resource is different from the second value of the corresponding parameter in the transmission parameter set available for the first logical channel comprises:
determining that the terminal device has an available first-type uplink resource, and a first value of a parameter in a transmission parameter set of the available first-type uplink resource is different from a second value of a corresponding parameter in a transmission parameter set available for the first logical channel.

6. The method according to claim 1, wherein the method further comprises:
determining an SR configuration corresponding to the first logical channel or the SR, wherein
the SR configuration comprises at least one of the following parameters: an identifier of the SR configuration, an SR prohibit timer, a maximum quantity of SR transmissions, and a parameter used to determine a location of a physical resource to be used to transmit the SR.

7. The method according to claim 6, wherein the method further comprises:
in response to determining:
that there is, in a first time unit, no uplink resource available to transmit the data of the first logical channel;
the terminal device has, in a time period in which the first time unit coincides with another time unit, the physical resource to be used to transmit the SR,
the physical resource corresponds with the SR configuration, and
the SR prohibit timer is not running,
sending the SR on the physical resource.

8. The method according to claim 1, wherein after the triggering the SR, the method further comprises:
in response to the terminal device having an uplink resource available to transmit the data of the first logical channel, canceling the SR.

9. The method according to claim 1, wherein the corresponding parameter in the transmission parameter set available for the first logical channel further comprises a subcarrier spacing.

10. The method according to claim 1, wherein the corresponding parameter in the transmission parameter set available for the first logical channel further comprises an uplink resource transmission duration.

11. A terminal device, comprising:
a processor, and a memory, wherein the memory is configured to store instructions, and the processor is configured to execute the instructions stored in the memory, so that the terminal device performs the scheduling request processing steps of:
determining that:
a regular buffer status report (BSR) associated with a first logical channel is triggered and has not been canceled,
there is an available uplink resource,
a first value of at least one parameter in a transmission parameter set of the available uplink resource is different from a second value of a corresponding parameter in a transmission parameter set available for the first logical channel; and
a first timer of a terminal device is not running; and
triggering a scheduling request (SR) in response to the determining that the regular BSR is triggered and has not been canceled, there is the available uplink resource, the first value is different from the second value and the first timer is not running;
wherein the corresponding parameter in the transmission parameter set available for the first logical channel comprises a serving cell of the terminal device corresponding to an uplink resource.

12. The terminal device according to claim 11, wherein the regular BSR associated with the first logical channel is a BSR triggered by arrival of new data on the first logical channel; or
a BSR triggered by BSR retransmission timer expiry; and
the first logical channel is a logical channel with a highest priority among all current logical channels of the terminal device having data available for transmission, or having data available for transmission and belonging to a logical channel group.

13. The terminal device according to claim 11, wherein in the step of determining that there is the available uplink resource, and the first value of at least one parameter in the transmission parameter set of the available uplink resource is different from the second value of the corresponding parameter in the transmission parameter set available for the first logical channel further comprises the steps of:
determining that there is an available uplink resource in a first time unit, and, in the first time unit, a first value of at least one parameter in a transmission parameter set of the available uplink resource is different from a second value of a corresponding parameter in a transmission parameter set available for the first logical channel.

14. The terminal device according to claim 11, wherein the processor is further configured to execute the instructions stored in the memory, so that the terminal device performs the scheduling request processing the steps of:
determining an SR configuration corresponding to the first logical channel or the SR, wherein
the SR configuration comprises at least one of the following parameters: an identifier of the SR configuration, an SR prohibit timer, a maximum quantity of SR transmissions, and a parameter used to determine a location of a physical resource to be used to transmit the SR.

15. The terminal device according to claim 11, wherein the corresponding parameter in the transmission parameter set available for the first logical channel further comprises a subcarrier spacing.

16. The terminal device according to claim 11, wherein the corresponding parameter in the transmission parameter set available for the first logical channel further comprises an uplink resource transmission duration.

17. A non-transitory computer-readable storage medium comprising instructions which, when executed by a computer, cause the computer to carry out steps of:
determining that:
a regular buffer status report, BSR, associated with a first logical channel is triggered and has not been canceled,
there is an available uplink resource,
a first value of at least one parameter in a transmission parameter set of the available uplink resource is different from a second value of a corresponding parameter in a transmission parameter set available for the first logical channel, and
a first timer of a terminal device is not running; and
triggering a scheduling request, SR, in response to the determining that the regular BSR is triggered and has not been canceled, that there is the available uplink resource, the first value is different from the second value and the first timer is not running;
wherein the corresponding parameter in the transmission parameter set available for the first logical channel comprises a serving cell of the terminal device corresponding to an uplink resource.

18. The non-transitory computer-readable storage medium according to claim 17, wherein the corresponding parameter in the transmission parameter set available for the first logical channel further comprises a subcarrier spacing.

19. The non-transitory computer-readable storage medium according to claim 17, wherein the corresponding parameter in the transmission parameter set available for the first logical channel further comprises an uplink resource transmission duration.

\* \* \* \* \*